(12) United States Patent
Kotani

(10) Patent No.: US 9,088,732 B2
(45) Date of Patent: *Jul. 21, 2015

(54) PROJECTION DISPLAY DEVICE

(75) Inventor: Kazunori Kotani, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 133 days.

This patent is subject to a terminal disclaimer.

(21) Appl. No.: 13/992,620

(22) PCT Filed: Oct. 31, 2011

(86) PCT No.: PCT/JP2011/075027
§ 371 (c)(1),
(2), (4) Date: Jun. 7, 2013

(87) PCT Pub. No.: WO2012/081317
PCT Pub. Date: Jun. 21, 2012

(65) Prior Publication Data
US 2013/0258291 A1    Oct. 3, 2013

(30) Foreign Application Priority Data
Dec. 16, 2010    (JP) .................................. 2010-280653

(51) Int. Cl.
*G03B 21/14* (2006.01)
*H04N 9/31* (2006.01)
(Continued)

(52) U.S. Cl.
CPC ............. *H04N 9/3141* (2013.01); *G03B 21/16* (2013.01); *G03B 21/206* (2013.01); *G03B 21/2013* (2013.01); *G03B 21/2026* (2013.01); *G03B 21/2086* (2013.01); *H04N 9/3164* (2013.01); *H04N 9/3197* (2013.01)

(58) Field of Classification Search
CPC .. H04N 9/3141; H04N 9/3144; H04N 9/3197
USPC .......... 353/52, 69, 85, 94, 119; 362/253, 264, 362/268, 293, 373, 583; 315/112, 117, 118, 315/149, 169.3, 309
See application file for complete search history.

(56) References Cited

U.S. PATENT DOCUMENTS

| 8,277,050 | B2 * | 10/2012 | Furumi ............................ 353/57 |
| 2006/0102713 | A1 * | 5/2006 | Chiang et al. ................. 235/375 |
| 2006/0119802 | A1 |  6/2006 | Akiyama |

(Continued)

FOREIGN PATENT DOCUMENTS

| JP | 9-130700 | 5/1997 |
| JP | 2000-155291 | 6/2000 |

(Continued)

*Primary Examiner* — Sultan Chowdhury
(74) *Attorney, Agent, or Firm* — Hamre, Schumann, Mueller & Larson, P.C.

(57) ABSTRACT

A projection display device includes light source device including a plurality of lamp units; a plurality of lamp apertures disposed in main body cabinet such that the plurality of lamp units are replaced therethrough; a plurality of lamp covers for covering respective lamp apertures; four first detection switches for detecting opening and closing of respective lamp covers; and lamp control power source unit for supplying ballast control voltage signal to first detection switches. Four first detection switches are disposed on sub-circuit board. Sub-circuit board also includes conductive pattern for branching ballast control voltage signal input to first jack and leading the branched signal to first detection switches.

13 Claims, 22 Drawing Sheets

(51) Int. Cl.
*G03B 21/20* (2006.01)
*G03B 21/16* (2006.01)

(56) References Cited

U.S. PATENT DOCUMENTS

2007/0024823 A1* 2/2007 Chung .......................... 353/85
2009/0040468 A1* 2/2009 Kameoka et al. ............... 353/52
2009/0141245 A1* 6/2009 Nozaki et al. .................. 353/56
2010/0026965 A1* 2/2010 Namba et al. .................. 353/61
2010/0117539 A1 5/2010 Kotani et al.

FOREIGN PATENT DOCUMENTS

| JP | 2007-108625 | 4/2007 |
| JP | 2008-145699 | 6/2008 |
| JP | 2010-113915 | 5/2010 |
| JP | 2010-276818 | 12/2010 |

* cited by examiner

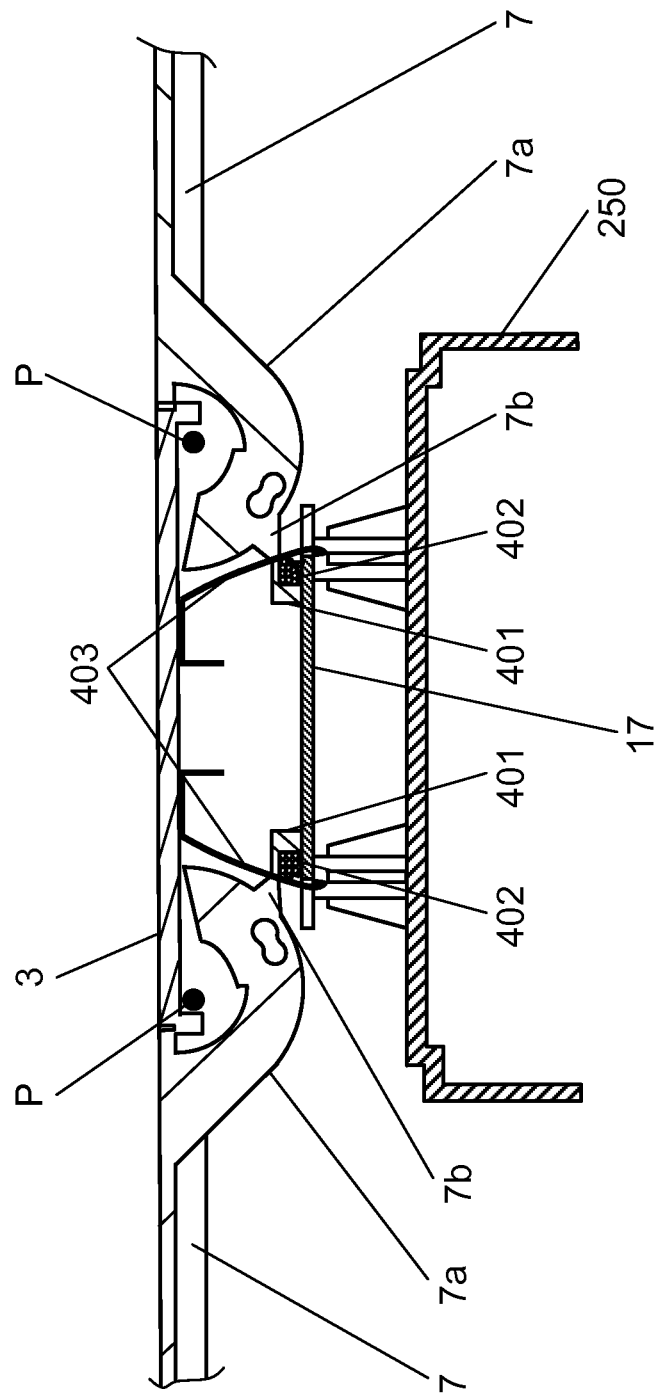

FIG. 16

| | Normal | Opening of lamp cover | | | | Abnormal temperature | Abnormal PFC | | | |
|---|---|---|---|---|---|---|---|---|---|---|
| | | LF | RF | LB | RB | | LF | RF | LB | RB |
| LPCV_LF | H | L | H | H | H | H | H | H | H | H |
| LPCV_RF | H | H | L | H | H | H | H | H | H | H |
| LPCV_LB | H | H | H | L | H | H | H | H | H | H |
| LPCV_RB | H | H | H | H | L | H | H | H | H | H |
| PFCERR_LF | H | L | H | H | H | L | L | H | H | H |
| PFCERR_RF | H | H | L | H | H | L | H | L | H | H |
| PFCERR_LB | H | H | H | L | H | L | H | H | L | H |
| PFCERR_RB | H | H | H | H | L | L | H | H | H | L |

PROJECTION DISPLAY DEVICE

This application is a U.S. National Phase Application of PCT International Application PCT/JP2011/075027.

TECHNICAL FIELD

The present invention relates to a projection display device that modulates light from light sources and projects the modulated light onto a projection surface.

BACKGROUND ART

Conventionally, in a projection display device (hereinafter referred to as "projector"), e.g. a liquid crystal projector, light modulated by a light modulation element, e.g. a liquid crystal panel, is projected onto a projection surface by a projection lens. Examples of the light source include a lamp. When a lamp is used for an extended period of time, the lamp deteriorates. Thus, after having reached its end of life, the lamp needs to be replaced with a new one.

In order for the lamp to be replaced smoothly, a projector main body can include an aperture through which the lamp is taken in and out. In this case, the aperture is covered with a cover. When replacing the lamp, the user opens the cover and takes out the lamp.

A detection switch for detecting opening and closing of the cover can be disposed in such a projector (see Patent Literature 1, for example). When the user opens the cover while the lamp is lit, the detection switch detects that the cover is opened and the lamp is turned off.

In order to increase the intensity, such a projector can be configured so as to include a plurality of lamps, which is called a multi-lamp configuration. In this case, each lamp has an aperture and a cover. A detection switch is disposed for each lamp.

CITATION LISTS

Patent Literature

Patent Literature 1: Japanese Patent Unexamined Publication No. 2008-145699

SUMMARY OF THE INVENTION

A projection display device of a first aspect of the present invention includes the following elements:

a light source device including a plurality of light sources and combining light from the light sources such that the combined light emits from the light source device;

a light modulator for modulating the light having emitted from the light source device;

a main body cabinet having the light source device and the light modulator disposed therein;

a plurality of apertures disposed in the main body cabinet such that the respective light sources are taken in and out therethrough;

a plurality of light source covers for covering the respective apertures;

a plurality of opening and closing detectors disposed correspondingly to the respective light source covers and detecting opening and closing of the respective light source covers; and a supply part for supplying an electrical signal to the respective opening and closing detectors.

The respective opening and closing detectors are disposed on one circuit board. The circuit board includes an input part to which the electrical signal is input from the supply part, and a conductive path for branching the electrical signal having input to the input part and for leading the branched signal to each of the opening and closing detectors.

A projection display device of a second aspect of the present invention includes the following elements:

a light source device including a plurality of light sources and combining light from the light sources such that the combined light emits from the light source device;

a plurality of light source drivers disposed correspondingly to the respective light sources and driving the respective light sources; and a plurality of temperature detectors disposed in different positions in the periphery of the respective light sources.

The electrical signal obtained by branching the electrical signal from a signal supply source is input to the respective light source drivers such that the light source drivers drive the respective light sources. The respective temperature detectors are disposed in series with each other on the signal line from the supply part to the places where the electrical signal is branched, and interrupt the electrical signal from the supply part when the detected temperature exceeds a threshold. When the electrical signal from the supply part is interrupted and thereby the respective branched electrical signals are not input, the light source drivers stop the driving of the respective light sources.

BRIEF DESCRIPTION OF THE DRAWINGS

FIGS. 7A-C are diagrams showing a configuration for detecting opening and closing of a lamp cover in accordance with the exemplary embodiment.

FIG. 16 is a table showing states of opening and closing signals and PFC error signals corresponding to the respective lamp units when the projector is in various states in accordance with the exemplary embodiment.

DESCRIPTION OF EMBODIMENT

Hereinafter, a projector in accordance with an exemplary embodiment is described with reference to the accompanying drawings.

<Overall Configuration of Projector>

Figure 1:
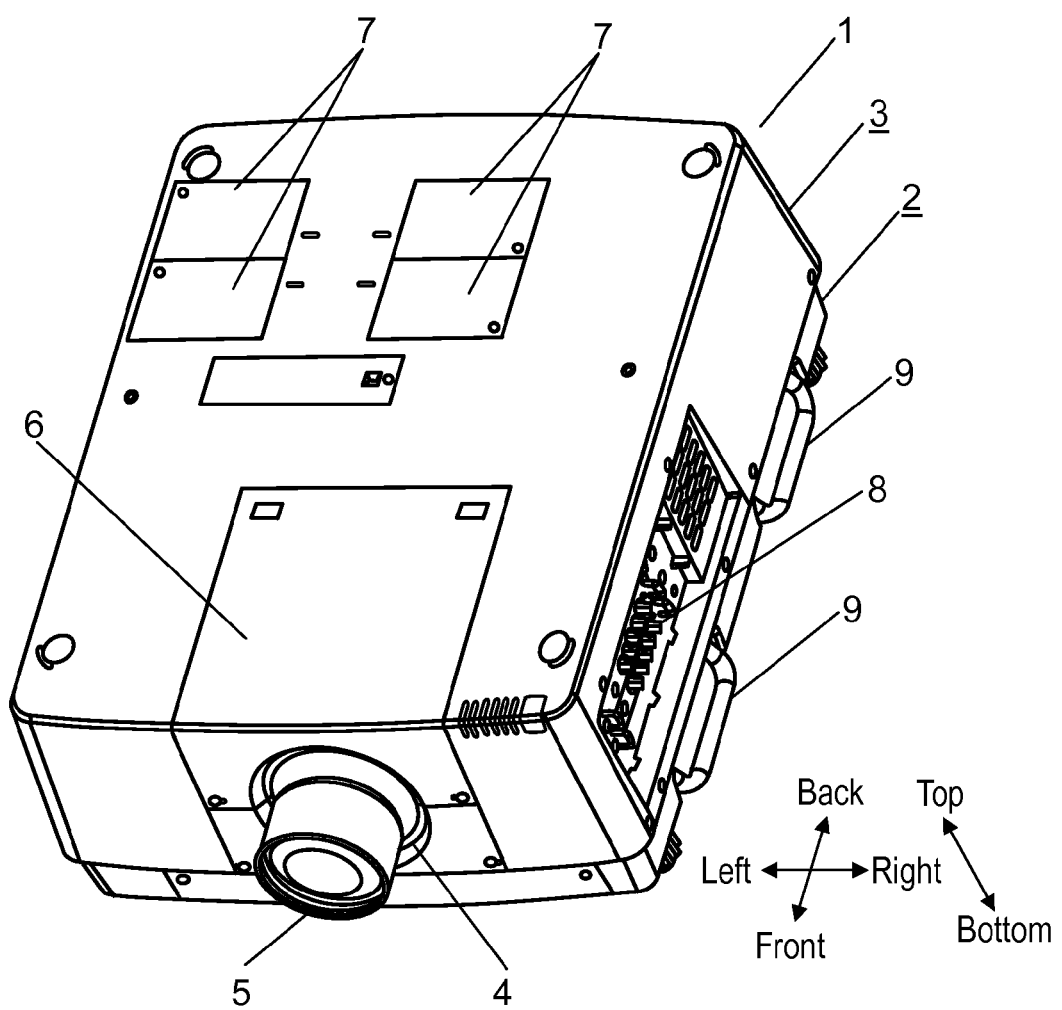
FIG. 1 is a diagram showing an external configuration of a projector in accordance with an exemplary embodiment of the present invention.

FIG. 1 is a diagram showing an external configuration of the projector. The projector of the exemplary embodiment includes four lamp units, which is a large projector called a four-lamp type.

Referring to FIG. 1, the projector includes main body cabinet 1 shaped into a substantially rectangular parallelepiped. Main body cabinet 1 is formed of lower cabinet 2 and upper cabinet 3 that covers lower cabinet 2 from the upper direction.

Projection window 4 is formed in the front center of upper cabinet 3. The front face of projection lens 5 is exposed to the outside through projection window 4.

Main cover 6 that covers a main opening is disposed in upper cabinet 3 from the front face to the top face thereof. The main opening is disposed for replacement of projection lens 5 or a prism unit, adjustment of polarizing plates, or the like. Four lamp covers 7 that cover respective four lamp apertures are disposed in the top back portion of upper cabinet 3. Each of the lamp apertures is disposed above the corresponding lamp unit such that the lamp unit is replaced therethrough.

Further, input/output terminal part 8 is disposed on the right side face of upper cabinet 3. Various audio visual (AV) terminals are disposed in input/output terminal part 8, and AV signals are input through the AV terminals.

Two handles 9 are disposed on each of the right and left side faces of lower cabinet 2. Handles 9 are used when the projector is carried.

Figure 2:
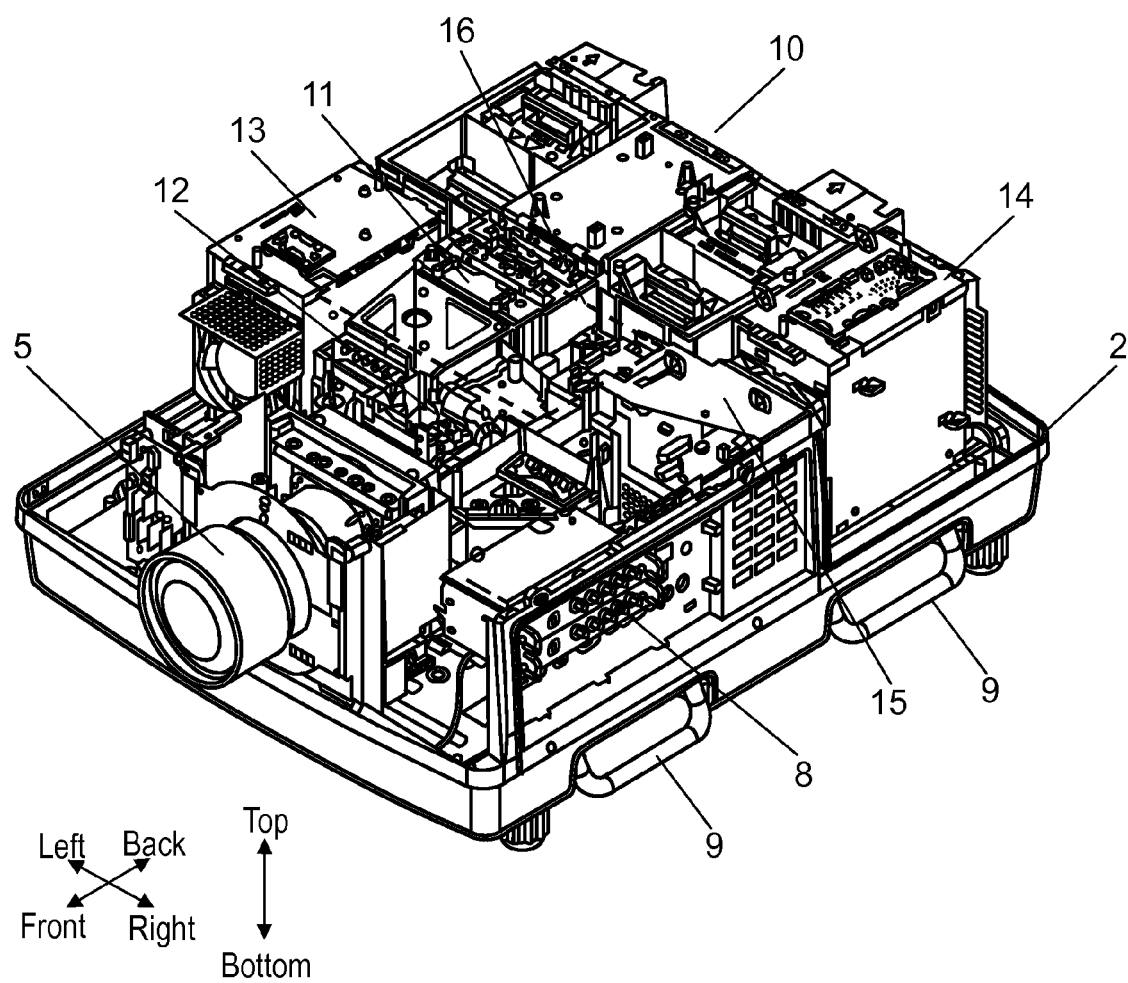
FIG. 2 is a drawing showing an internal structure of the projector in accordance with the exemplary embodiment.

FIG. 2 is a drawing that shows an internal structure of the projector with upper cabinet 3 thereof removed.

Referring to FIG. 2, light source device 10 and optical system 11 are disposed inside lower cabinet 2. The optical system modulates the light having emitted from light source device 10 and generates image light.

Light source device 10 is disposed in the back portion of lower cabinet 2. Optical system 11 is disposed on the front side of light source device 10. Optical system 11 is disposed on lower cabinet 2 such that prism unit 12 is attachable and detachable to and from optical system 11 from the upward direction. The configurations of light source device 10 and optical system 11 will be detailed later.

Projection lens 5 is disposed on the front side of optical system 11. Projection lens 5 magnifies the image light generated by optical system 11 and projects the magnified image onto a projection surface, such as a screen.

First lamp power source unit 13 is disposed on the left side of optical system 11. Second lamp power source unit 14 is disposed on the right side of light source device 10. First lamp power source unit 13 includes two lamp power source units for supplying electric power to two front and back lamp units, respectively, on the left side. Second lamp power source unit 14 includes two lamp power source units for supplying electric power to two front and back lamp units, respectively, on the right side. Main power source unit 15 is disposed on the front side of second lamp power source unit 14. Main power source unit 15 supplies electric power to electrical components (e.g. liquid crystal panels) forming optical system 11, and to control circuit board 16, for example.

Control circuit board 16 is disposed above optical system 11. Control circuit board 16 includes a control circuit for controlling the electrical components, such as liquid crystal panels and lamp units. In FIG. 2, control circuit board 16 is shown by a broken line such that optical system 11 is visible.

<Configuration of Optical System>

Figure 3:
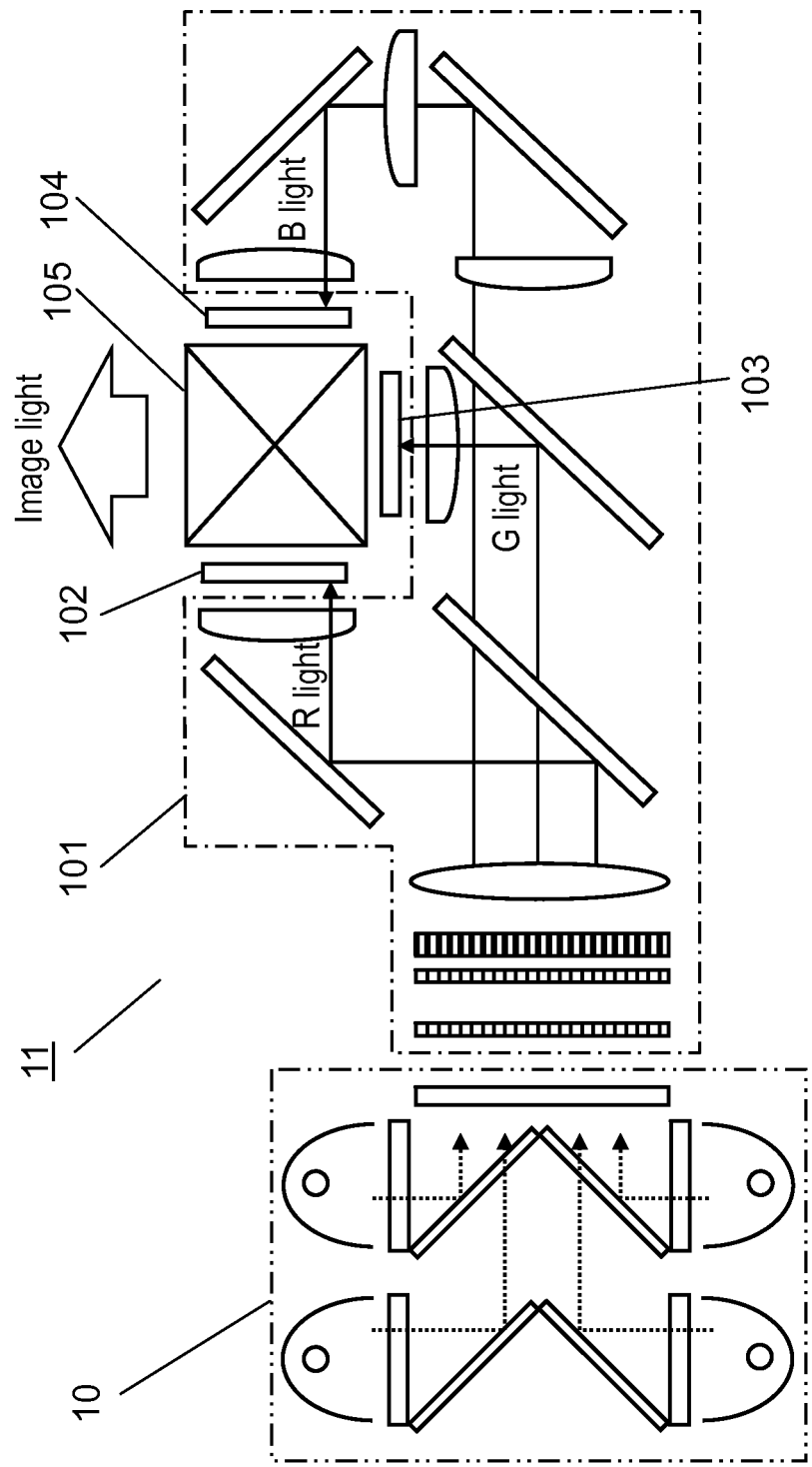
FIG. 3 is a diagram showing a configuration of an optical system in accordance with the exemplary embodiment.

FIG. 3 is a diagram showing a configuration of optical system 11.

As shown in FIG. 3, optical system 11 includes light-guiding optical system 101, three transmissive liquid crystal panels 102, 103, and 104, and dichroic prism 105. A polarizing plate (not shown) is disposed on the incident side and the emit side of each of liquid crystal panels 102, 103, and 104.

White light having emitted from light source device 10 goes into light-guiding optical system 101. Light-guiding optical system 101 includes a fly's eye integrator, a PBS array, a condenser lens, dichroic mirrors, planar mirrors, and relay lenses. The white light incident on light-guiding optical system 101 is separated into a light beam in the red wavelength band (hereinafter "R light"), a light beam in the green wavelength band (hereinafter "G light"), and a light beam in the blue wavelength band (hereinafter "B light"). Liquid crystal panels 102, 103, and 104 are irradiated with the respective light beams. The R light, G light, and B light having modulated by liquid crystal panels 102, 103, and 104, respectively, are color-combined by dichroic prism 105 and emit therefrom as image light. Liquid crystal panels 102, 103, and 104, and dichroic prism 105 are integrated so as to form prism unit 12.

Examples of a light modulation element forming optical system 11 include a reflective liquid crystal panel and a micro-electro-mechanical system (MEMS) device other than the above transmissive liquid crystal panels 102, 103, and 104. Instead of the above three-plate type optical system that includes three light modulation elements, a one-plate type optical system that includes one light modulation element and a color wheel may be used.

<Configuration of Light Source Device>

Figure 4:
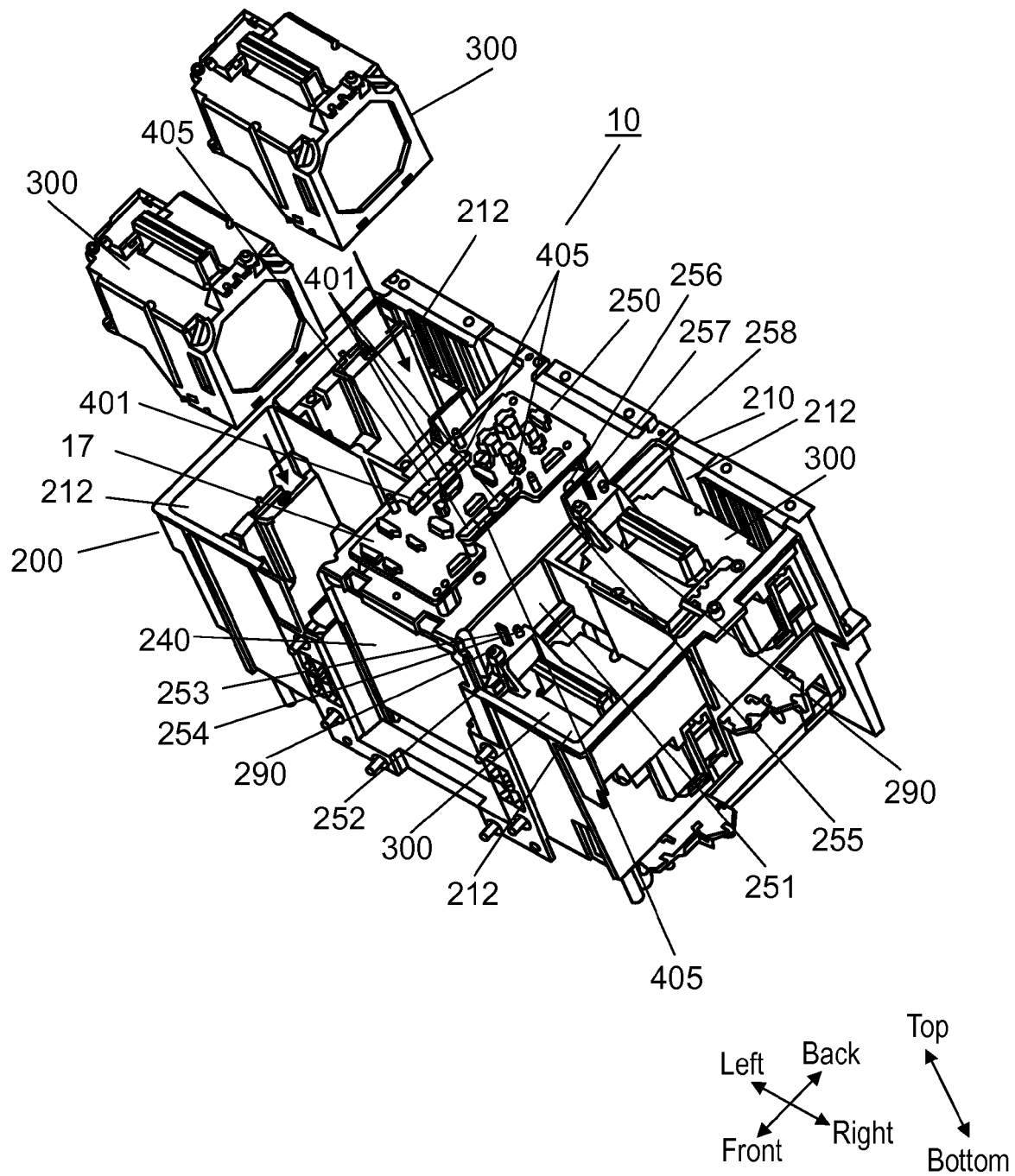
FIG. 4 is a drawing showing a configuration of a light source device in accordance with the exemplary embodiment.
Figure 5:
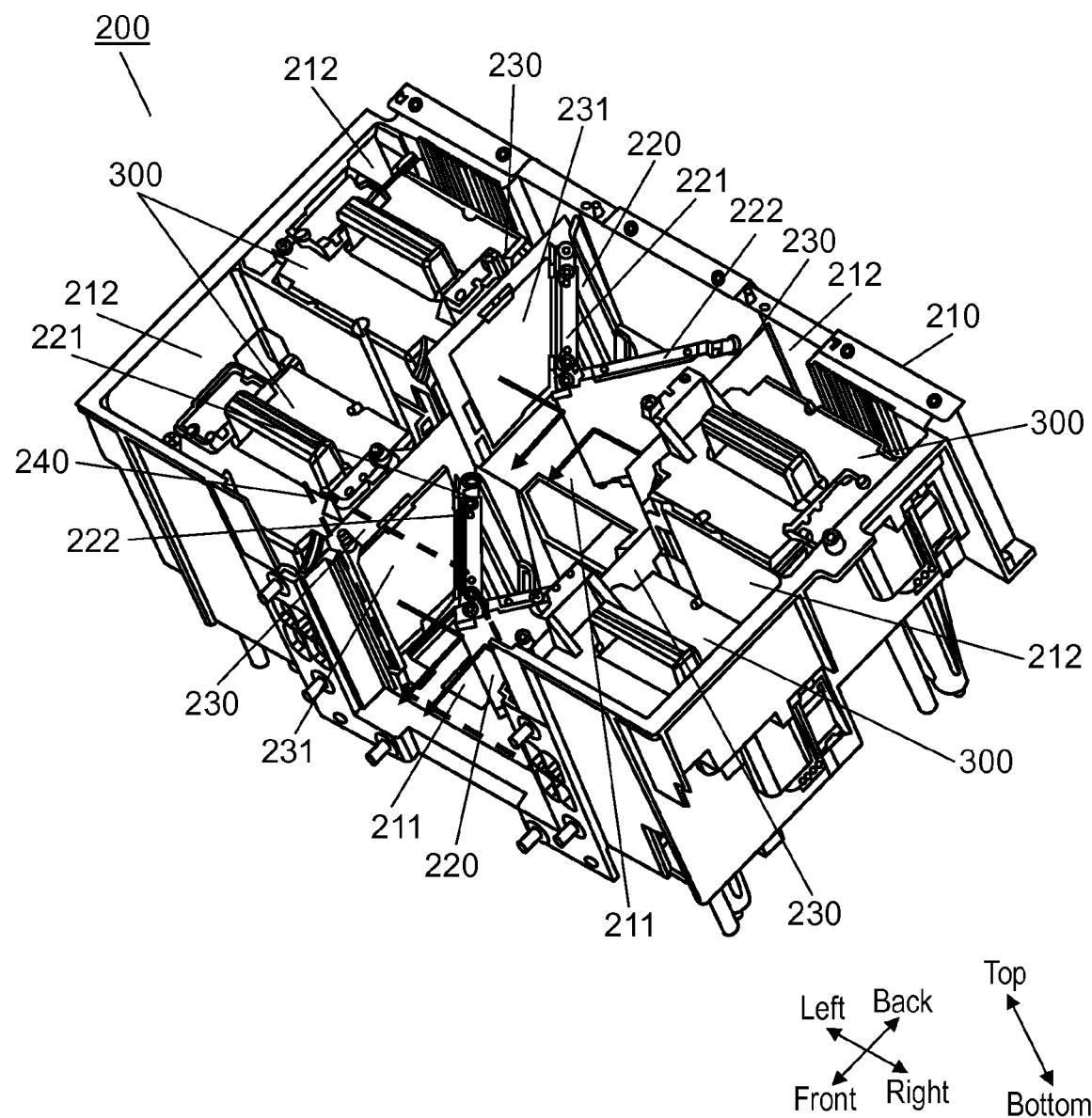
FIG. 5 is a drawing showing a configuration of the light source device in accordance with the exemplary embodiment.

FIG. 4 and FIG. 5 are drawings showing a configuration of light source device 10. FIG. 4 is a perspective view showing the state where two lamp units 300 are removed from lamp mounting unit 200. FIG. 5 is a perspective view showing the state where mirror cover 250 is removed.

Referring to FIG. 4 and FIG. 5, light source device 10 includes lamp mounting unit 200 fixed to lower cabinet 2 and four lamp units 300 mounted in lamp mounting unit 200.

Lamp mounting unit 200 includes housing 210, two mirror members 220, four first UV cutting members 230, second UV cutting member 240, and mirror cover 250.

Housing 210 is formed of a resin material, and includes two mirror positioning parts 211 in the center and four lamp receivers 212 formed on both sides of mirror positioning parts 211. The bottom face of mirror positioning part 211 on the front side is lower than the bottom face of mirror positioning part 211 on the back side. The bottom faces of the pair of right and left lamp receivers 212 on the front side are lower than the bottom faces of the pair of right and left lamp receivers 212 on the back side. Each mirror member 220 is disposed in corresponding mirror positioning part 211. Each lamp unit 300 is mounted in corresponding lamp receiver 212.

In each mirror member 220, V-shaped planar mirror 222 is mounted on the front face of V-shaped base member 221. Mirror member 220 reflects the light having emitted from corresponding lamp units 300 and guides the reflected light to the front direction.

Each of first UV cutting members 230 includes UV cutting glass 231 for blocking the passage of ultraviolet rays. Each first UV cutting member 230 is disposed between lamp receiver 212 and corresponding mirror positioning part 211.

Second UV cutting member 240 is a UV cutting glass for blocking the passage of ultraviolet rays, and disposed on the front side of front mirror positioning part 211. Second UV cutting member 240 is higher than the optical path of the light that is reflected by mirror member 220 on the back side and goes forward.

Mirror cover 250 is disposed over mirror positioning parts 211. On the right and left sides of the front part of mirror cover 250, side part 251 is formed so as to extend to the top end of corresponding first UV cutting member 230. Each of side parts 251 has receiver 252 for receiving flange 326a of corresponding lamp unit 300 when lamp unit 300 is mounted in lamp receiver 212. Guide rib 253 extends from each receiver 252 and positioning pin 254 protrudes therefrom. Mirror cover 250 further has receivers 255 on the right and left sides of the back part thereof. Guide rib 257 is formed on guide plate 256 that extends upward from each receiver 255. Positioning pin 258 is formed on each receiver 255.

Sub-circuit board 17 is mounted on the top face of mirror cover 250. Sub-circuit board 17 includes first detection switches 401 and second detection switches 405 for detecting opening and closing of respective lamp covers 7. Examples of each of detection switches 401 and 405 include a microswitch. First detection switch 401 and second detection switch 405 are disposed adjacent to each other correspondingly to each lamp cover 7.

Figure 6A:
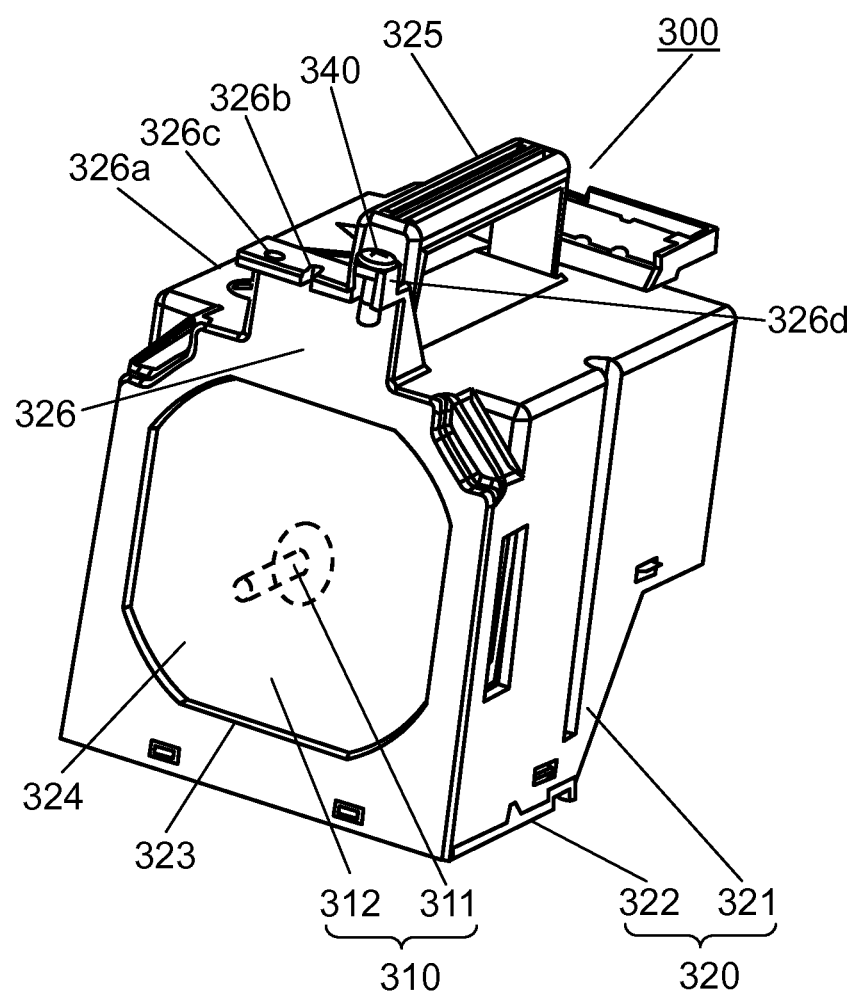
FIGS. 6A-B are diagrams showing a configuration of a lamp unit in accordance with the exemplary embodiment.
Figure 6B:
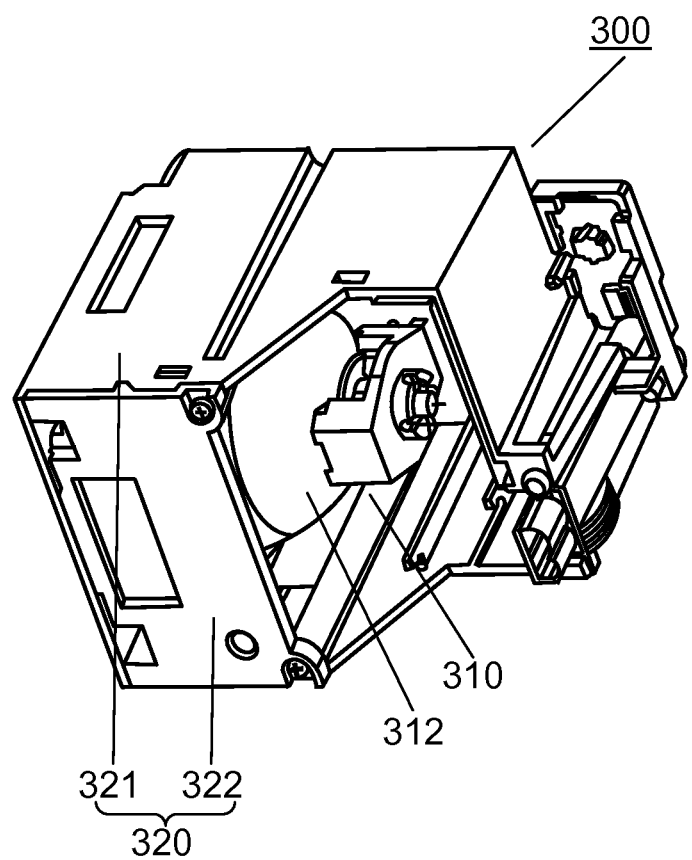

FIG. 6 is a diagram showing a configuration of lamp unit 300. FIG. 6(a) is a perspective view of lamp unit 300 as viewed from a front oblique direction. FIG. 6(b) is a perspective view of lamp unit 300 as viewed from a rear oblique direction.

Referring to FIG. 6, lamp unit 300 includes lamp 310 and lamp holder 320 for holding lamp 310. Lamp 310 has arc tube 311 for emitting white light, and reflector 312 for reflecting the white light emitted from arc tube 311. Examples of lamp 310 include an ultrahigh pressure mercury lamp and a xenon lamp.

Lamp holder 320 is formed of a resin material, and has holder body 321 and bottom plate 322. On the front face of holder body 321, emit window 323 is formed such that the light from lamp 310 emits therefrom. Heat-resistant glass plate 324 is fitted in emit window 323. The bottom face of holder body 321 is open such that lamp 310 is mounted from the bottom direction. Bottom plate 322 is attached to the front half of the bottom face of holder body 321 so as to support the bottom part of lamp 310.

Handle 325 is disposed on the top face of holder body 321. Handle 325 is used when lamp unit 300 is carried, or attached to or detached from lamp mounting unit 200. Lamp fixation part 326 is disposed on the front side of handle 325. Lamp fixation part 326 has flange 326a formed at the top end thereof. Guide groove 326b, positioning hole 326c, and threaded screw hole 326d are formed in flange 326a. Screw 340 is inserted into threaded screw hole 326d.

As shown in FIG. 4, each lamp unit 300 is inserted in corresponding ramp receiver 212 in the state where the front side thereof (the side of emit window 323) faces mirror positioning part 211. At this time, guide groove 326b of flange 326a is placed along guide rib 253 (257) of mirror cover 250.

When each lamp unit 300 is completely mounted in lamp receiver 212, flange 326a of lamp unit 300 makes contact with receiver 252 (255) of mirror cover 250, and positioning pin 254 (258) fits into positioning hole 326c of flange 326a. Screw 340 inserted in threaded screw hole 326d fixes flange 326a to receiver 252 (255) (see FIG. 4). Thus, lamp units 300 are fixed to lamp mounting unit 200.

When the projector operates in the state where four lamp units 300 are mounted in lamp mounting unit 200, light emits from each lamp unit 300. As shown in FIG. 5, the light having emitted from each lamp unit 300 passes through corresponding first UV cutting member 230. At this time, ultraviolet rays are removed. The light having passed through each first UV cutting member 230 is reflected by mirror member 220 corresponding to lamp unit 300, and combined into a single light beam and goes forward. The pair of lamp units 300 on the front side are disposed at a position lower than that of the pair of lamp units 300 on the back side. Thus, the light from back lamp units 300 is not interrupted by front lamp units 300. The combined light beam passes through second UV cutting member 240, where the ultraviolet rays are further removed. Thus, the light from four lamp units 300 is combined and thereby high-intensity light emits from light source device 10.

<Configuration for Detecting Opening and Closing of Lamp Cover>

Figure 7B:
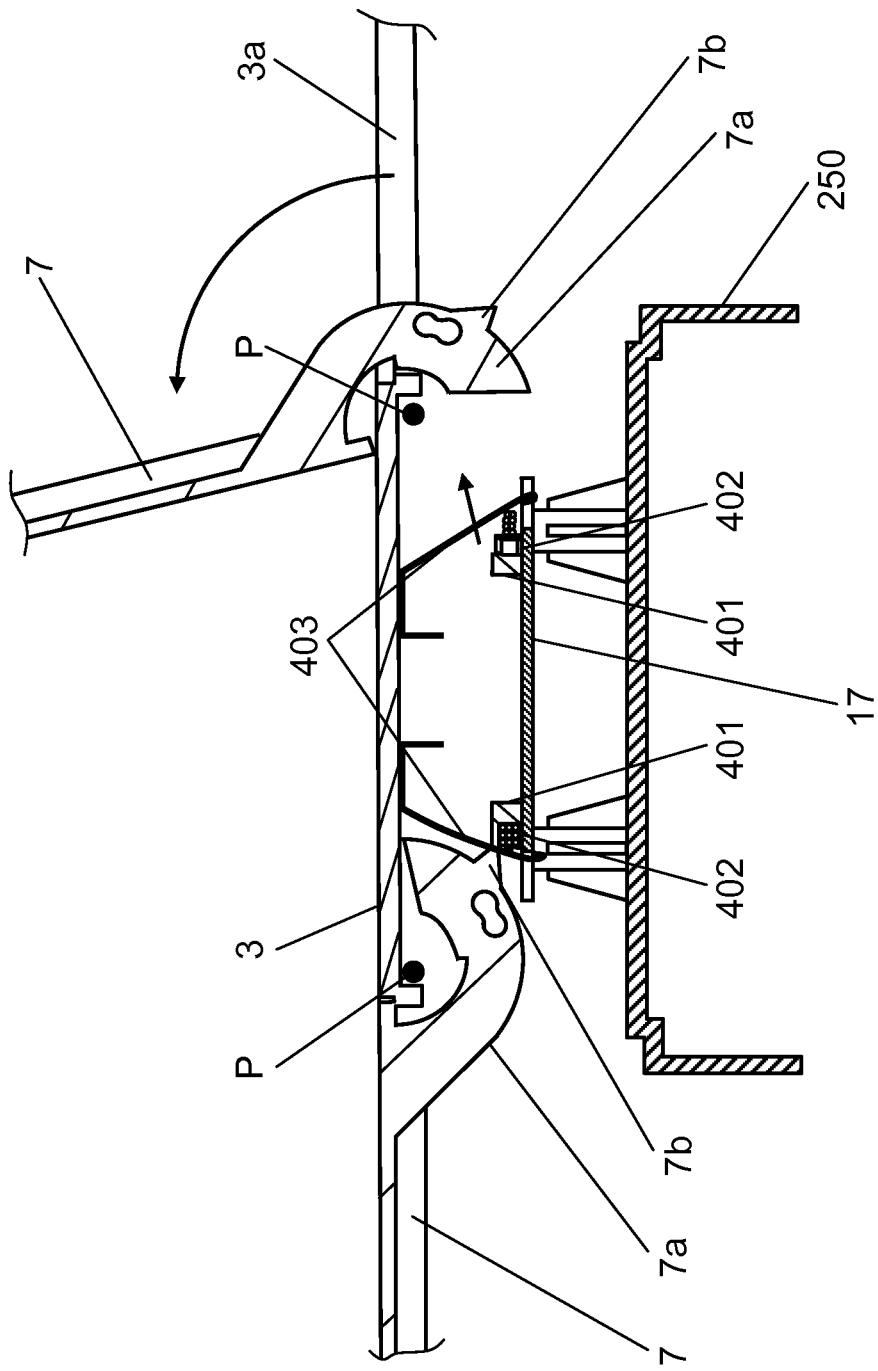
Figure 7C:
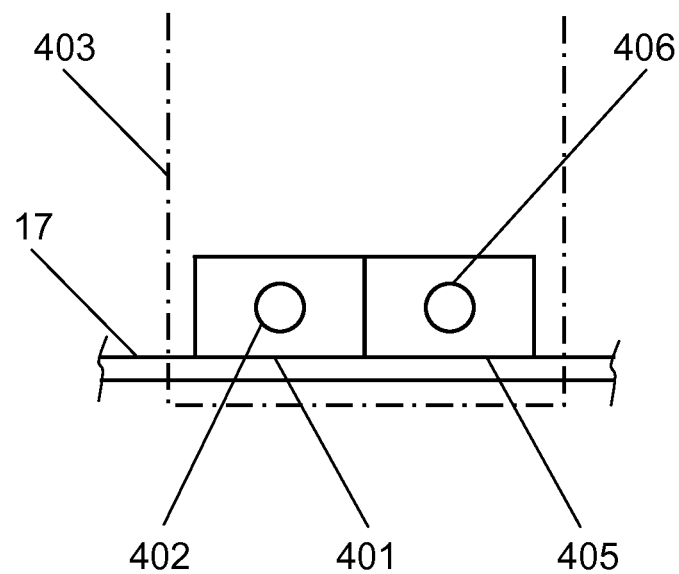

FIG. 7 is a diagram showing a configuration for detecting opening and closing of lamp cover 7, which is a sectional view of an essential part of upper cabinet 3 taken along the right-left direction in the position of lamp covers 7. FIG. 7 (a) shows the state where a pair of right and left lamp covers 7 are closed. FIG. 7 (b) shows the state where one of the pair of right and left lamp covers 7 is opened. FIG. 7 (c) is a diagram showing an essential part of pressing flat spring 403 as viewed from the front direction in order to show the relation between first detection switch 401, second detection switch 405, and the tip of pressing flat spring 403. In FIG. 7 (c), pressing flat spring 403 is shown by an alternate long and short dash line for convenience. FIG. 7 shows the part of a pair of right and left lamp covers 7 on one of the front and back sides. The part of the pair of right and left lamp covers 7 on the other side has the identical structure.

Referring to FIG. 7, rotary shaft P of each of the right and left lamp covers 7 is set in the front-back direction along the edge of lamp aperture 3a on the side of mirror positioning part 211. Lamp cover 7 rotates with rotary shaft P at the center thereof so as to open or close corresponding lamp aperture 3a.

Lamp cover 7 has lever 7a formed at the end on the side of rotary shaft P (on the side of mirror positioning part 211). Lever 7a has protrusion 7b formed thereon. Pressing flat springs 403 made of metal are attached to the back side of upper cabinet 3. As shown in FIG. 7 (c), the tip of pressing flat spring 403 is located on the front side of first detection switch 401 and second detection switch 405 disposed on sub-circuit board 17.

When each lamp cover 7 is closed as shown in FIG. 7 (a), the tip of pressing flat spring 403 is pressed by protrusion 7b of lever 7a, and thus deforms toward the side of detection switches 401 and 405, which presses buttons 402 and 406 of detection switches 401 and 405, respectively. Thus, detection switches 401 and 405 are closed.

In contrast, when lamp cover 7 is opened as shown in FIG. 7 (b), protrusion 7b of lever 7a leaves from the tip of pressing flat spring 403, and thus pressing flat spring 403 leaves from buttons 402 and 406 of detection switches 401 and 405, respectively. Thus, detection switches 401 and 405 are opened.

<Configuration of Control System for Driving Lamp Units>

Figure 8:
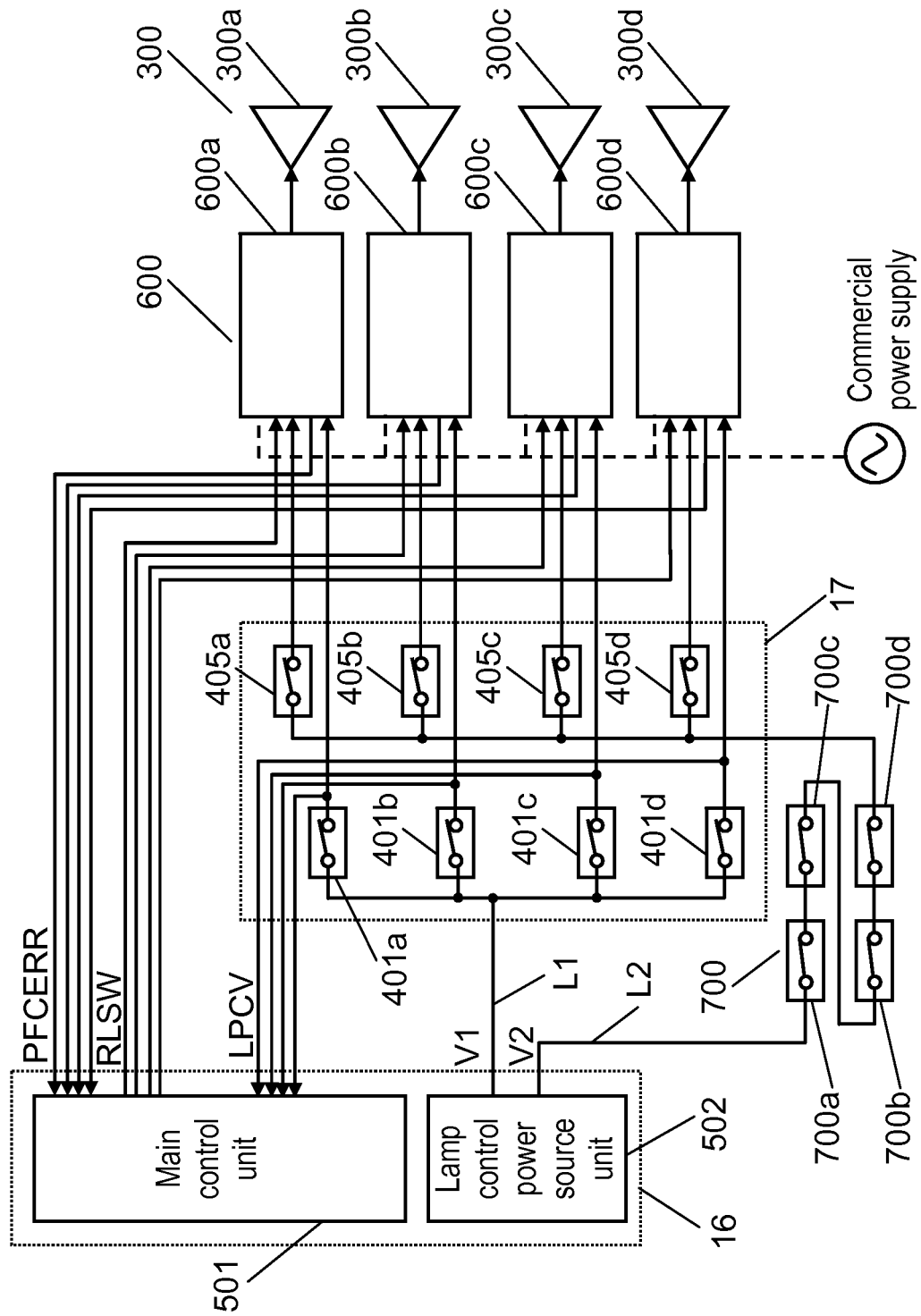
FIG. 8 is a block diagram showing a control system for controlling the lamp units in accordance with the exemplary embodiment.

FIG. 8 is a block diagram showing a control system for controlling lamp units 300.

In order to drive lamp units 300, main control unit 501 and lamp control power source unit 502 are disposed on control circuit board 16. Four lamp power source units 600 corresponding to four lamp units 300 are disposed separately as first lamp power source unit 13 and second lamp power source unit 14, as described above. Further, in order to protect lamp units 300 against high temperatures, temperature switches 700 are disposed in the projector.

Hereinafter, for the convenience of explanation, when each lamp unit 300 is identified separately, lamp unit 300 on the left front side in FIG. 5 is referred to as LF lamp unit 300a. Similarly, lamp units 300 on the right front side, left back side, and right back side are referred to as RF lamp unit 300b, LB lamp unit 300c, and RB lamp unit 300d, respectively. Lamp power source units 600 corresponding to LF lamp unit 300a, RF lamp unit 300b, LB lamp unit 300c, and RB lamp unit 300d are referred to as LF lamp power source unit 600a, RF lamp power source unit 600b, LB lamp power source unit 600c, and RB lamp power source unit 600d, respectively. First detection switches 401 corresponding to LF lamp unit 300a, RF lamp unit 300b, LB lamp unit 300c, and RB lamp unit 300d are referred to as first LF switch 401a, first RF switch 401b, first LB switch 401c, and first RB switch 401d, respectively. Second detection switches 405 corresponding to LF lamp unit 300a, RF lamp unit 300b, LB lamp unit 300c, and RB lamp unit 300d are referred to as second LF switch 405a, second RF switch 405b, second LB switch 405c, and second RB switch 405d, respectively. Temperature switches 700 corresponding to LF lamp unit 300a, RF lamp unit 300b, LB lamp unit 300c, and RB lamp unit 300d are referred to as LF temperature switch 700a, RF temperature switch 700b, LB temperature switch 700c, and RB temperature switch 700d, respectively. FIG. 8 bears the names and marks that separately identify lamp units 300, lamp power source units 600, first detection switches 401, second detection switches 405, and temperature switches 700.

Figure 9:
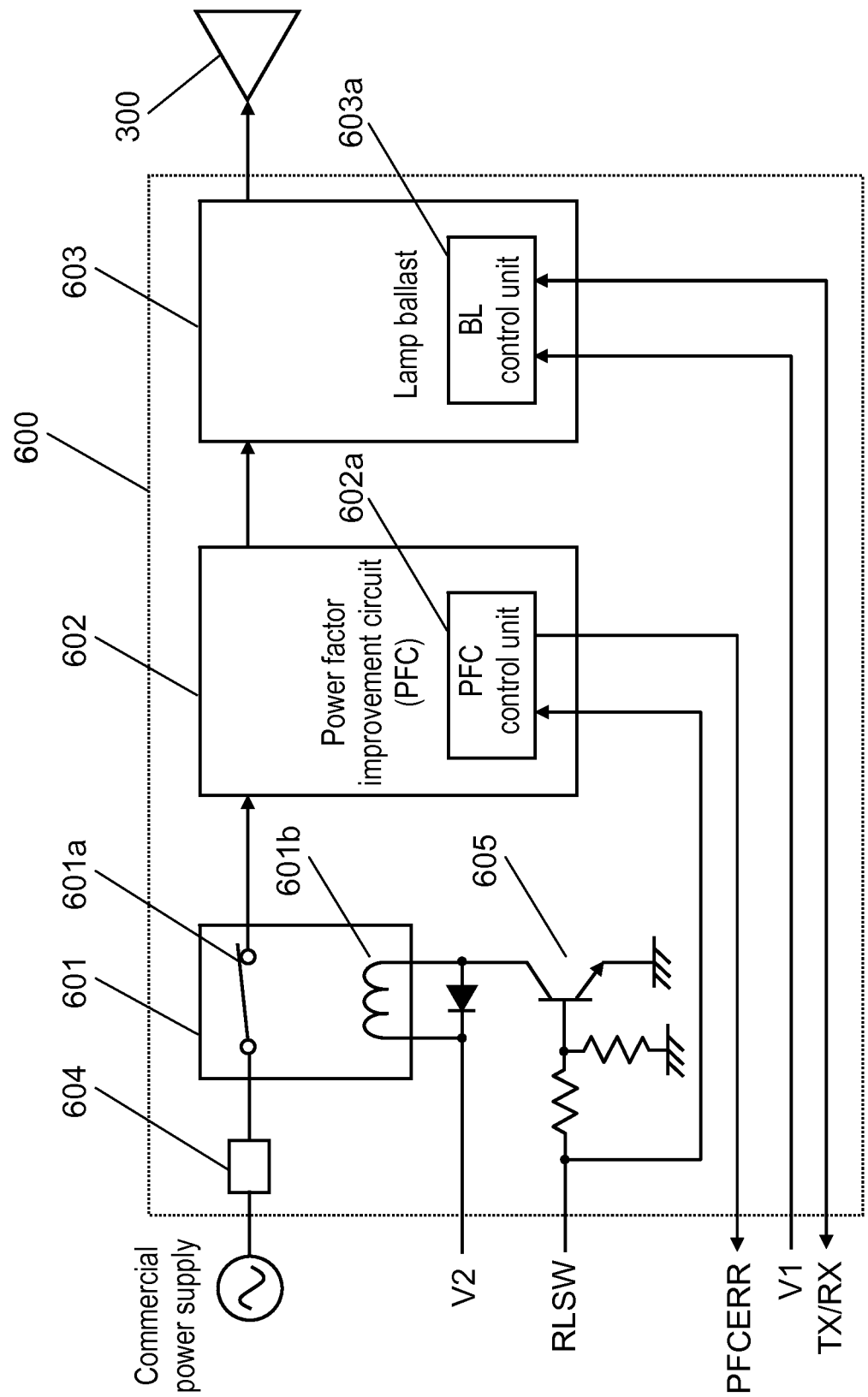
FIG. 9 is a block diagram showing a configuration of each lamp power source unit in accordance with the exemplary embodiment.

FIG. 9 is a block diagram showing a configuration of each lamp power source unit 600.

Each lamp power source unit 600 includes relay 601, power factor improvement circuit 602, and lamp ballast 603.

Contact 601a of relay 601 is connected to a commercial power supply via noise filter 604. An alternating current (AC) voltage signal at 240V, for example, is supplied from the commercial power supply. Coil 601b of relay 601 is connected to switching circuit 605. Switching circuit 605 includes a transistor and two resistors. A relay drive voltage signal (V2) generated by lamp control power source unit 502 is supplied to coil 601b. The relay drive voltage signal (V2) is at 12 V, for example. A relay control signal (RLSW) for controlling relay 601 is input to switching circuit 605 from main control unit 501.

Power factor improvement circuit 602 improves the power factor relative to the commercial power supply by making the current waveform analogous to the voltage waveform and approximate to a sine wave. The power factor improvement circuit converts the AC voltage signal into a direct current (DC) voltage signal and outputs the converted signal to lamp ballast 603. Power factor improvement circuit 602 includes PFC control unit. The relay control signal (RLSW) is input to PFC control unit 602a from main control unit 501. A PFC error signal (PFCERR) that indicates whether or not an abnormality has occurred in power factor improvement circuit 602 is output from PFC control unit 602a to main control unit 501.

Lamp ballast 603 converts the DC voltage signal received from power factor improvement circuit 602 to a rectangular AC voltage signal suitable for driving lamp unit 300 (lamp 310), and supplies the converted AC voltage signal to lamp unit 300. Thereby, lamp unit 300 is driven. Lamp ballast 603 includes BL control unit 603a. Based on a control signal (TX) from main control unit 501, BL control unit 603a controls the operation of lamp ballast 603. For instance, by changing the magnitude of an AC voltage signal to be supplied to lamp unit 300, the BL control unit changes the output of lamp unit 300. BL control unit 603a obtains information on lamp unit 300, such as the lighting state of lamp unit 300, and outputs an information signal (RX) to main control unit 501.

A Ballast control voltage signal (V1) generated by lamp control power source unit 502 is input to BL control unit 603a. The ballast control voltage signal (V1) is at 5V, for example. BL control unit 603a operates lamp ballast 603 when the ballast control voltage signal (V1) is input. The BL control unit stops lamp ballast 603 when the ballast control voltage signal (V1) is interrupted.

Returning to FIG. 8, four first detection switches 401 are disposed on signal line L1 of the ballast control voltage signal (V1) (hereinafter referred to as "V1 signal line L1") from lamp control power source unit 502 to four lamp power source units 600 (BL control units 603a). That is, first LF switch 401a is disposed on V1 signal line L1 between lamp control power source unit 502 and LF lamp power source unit 600a. First RF switch 401b is disposed on V1 signal line L1 between lamp control power source unit 502 and RF lamp power source unit 600b. First LB switch 401c is disposed on V1 signal line L1 between lamp control power source unit 502 and LB lamp power source unit 600c. First RB switch 401d is disposed on V1 signal line L1 between lamp control power source unit 502 and RB lamp power source unit 600d.

Four second detection switches 405 are disposed on signal line L2 of the relay drive voltage signal (V2) (hereinafter referred to as "V2 signal line L2") from lamp control power source unit 502 to four lamp power source units 600 (relays 601). That is, second LF switch 405a is disposed on V2 signal line L2 between lamp control power source unit 502 and LF lamp power source unit 600a. Second RF switch 405b is disposed on V2 signal line L2 between lamp control power source unit 502 and RF lamp power source unit 600b. Second LB switch 405c is disposed on V2 signal line L2 between lamp control power source unit 502 and LB lamp power source unit 600c. Second RB switch 405d is disposed on V2 signal line L2 between lamp control power source unit 502 and RB lamp power source unit 600d.

When each lamp cover 7 is closed and thus first detection switch 401 and second detection switch 405 are closed (see FIG. 7 (a)), V1 signal line L1 and V2 signal line V2 corresponding to these detection switches 401 and 405 are connected. In contrast, when lamp cover 7 is opened and thus first detection switch 401 and second detection switch 405 are opened (see FIG. 7 (b)), V1 signal line L1 and V2 signal line V2 corresponding to these detection switches 401 and 405 are interrupted.

When V1 signal line L1 is interrupted by first detection switch 401, the ballast control voltage signal (V1) is interrupted. When V2 signal line L2 is interrupted by second detection switch 405, the relay drive voltage signal (V2) is interrupted.

Four temperature switches 700 are disposed in series with each other on V2 signal line L2 from lamp control power source unit 502 to four second detection switches 405. Each of temperature switches 700 is closed when the ambient temperature, i.e. a detected temperature, is equal to or lower than a predetermined threshold. The temperature switch opens when the detected temperature exceeds the threshold. Examples of each temperature switch 700 include a thermostat. When one of four temperature switches 700 opens, V2 signal line L2 is interrupted and the relay drive voltage signal (V2) is interrupted. As described later, each of four temperature switches 700 is disposed in proximity to corresponding lamp unit 300.

The ballast control voltage signal (V1) is input from the output side of each first detection switch 401 to main control unit 501, as an opening and closing signal (LPCV) for detecting opening and closing of corresponding lamp cover 7. Main control unit 501 includes a pull-down resistor (not shown) in the ports to which opening and closing signals (LPCV) are input. When first detection switch 401 is closed and thus the ballast control voltage signal (V1) is input, the input port is at a high level. When first detection switch 401 is opened and thus the ballast control voltage signal (V1) is not input, the input port is at a low level.

Suppose a high-level relay control signal (RLSW) is output from main control unit 501 in the state where first detection switch 401, second detection switch 405, and temperature switches 700 are closed. Then, the transistor of switching circuit 605 in lamp power source unit 600 is turned on and a current based on the relay drive voltage (V2) flows in coil 601b of relay 601. This closes contact 601a and supplies the power from the commercial power supply to power factor improvement circuit 602. Thus, as described above, power factor improvement circuit 602 and lamp ballast 603 operate, thereby turning on lamp unit 300.

A high-level relay control signal (RLSW) is input to PFC control unit 602a. When power factor improvement circuit 602 operates normally in this state, a high-level PFC error signal (PFCERR) is output from PFC control unit 602a to main control unit 501.

The ballast control voltage signal (V1) is input to BL control unit 603a and BL control unit 603a keeps the operation of lamp ballast 603.

At this time, when lamp cover 7 is opened with lamp unit 300 turned on, first detection switch 401 and second detection switch 405 open. When detection switches 401 and 405 open, the relay drive voltage signal (V2) is interrupted. Thus, no current flows in coil 601b in relay 601, which opens contact 601a. As a result, the supply from the commercial power supply to power factor improvement circuit 602 is stopped. Further, the ballast control voltage signal (V1) is interrupted and is not input to BL control unit 603a. Thus, BL control unit 603a determines that lamp cover 7 is opened, and stops the operation of lamp ballast 603. In this manner, the driving of lamp unit 300 is stopped and lamp unit 300 is turned off.

At this time, a high-level relay control signal (RLSW) is input to PFC control unit 602a, but power factor improvement circuit 602 does not operate. Then, actually, no abnormality occurs in power factor improvement circuit 602, but a low-level PFC error signal (PFCERR) is output from PFC control unit 602a to main control unit 501. No ballast control voltage signal (V1) is output from the output side of first detection switch 401. Thus, a low-level opening and closing signal (LPCV) is input to main control unit 501.

Also in the case where any one of temperature switches 700 opens while lamp unit 300 is turned on, the relay drive voltage signal (V2) is interrupted and the supply from the commercial power supply to power factor improvement circuit 602 is stopped. Thus, the driving of lamp unit 300 is stopped. The low-level PFC error signal (PFCERR) is output from PFC control unit 602a to main control unit 501. However, in this case, since first detection switch 401 is closed, the ballast control voltage signal (V1) is output from the output side of first detection switch 401, and a high-level opening and closing signal (LPCV) is input to main control unit 501.

In the case where an abnormality occurs in power factor improvement circuit 602 while lamp unit 300 is turned on, a normal DC voltage signal is not output to lamp ballast 603, and thus the driving of lamp unit 300 is stopped. Further, the low-level PFC error signal is output from PFC control unit 602a to main control unit 501. Also in this case, the high-level opening and closing signal (LPCV) is input to main control unit 501.

<Configuration of Wiring for Driving Lamp Units>

Figure 10:
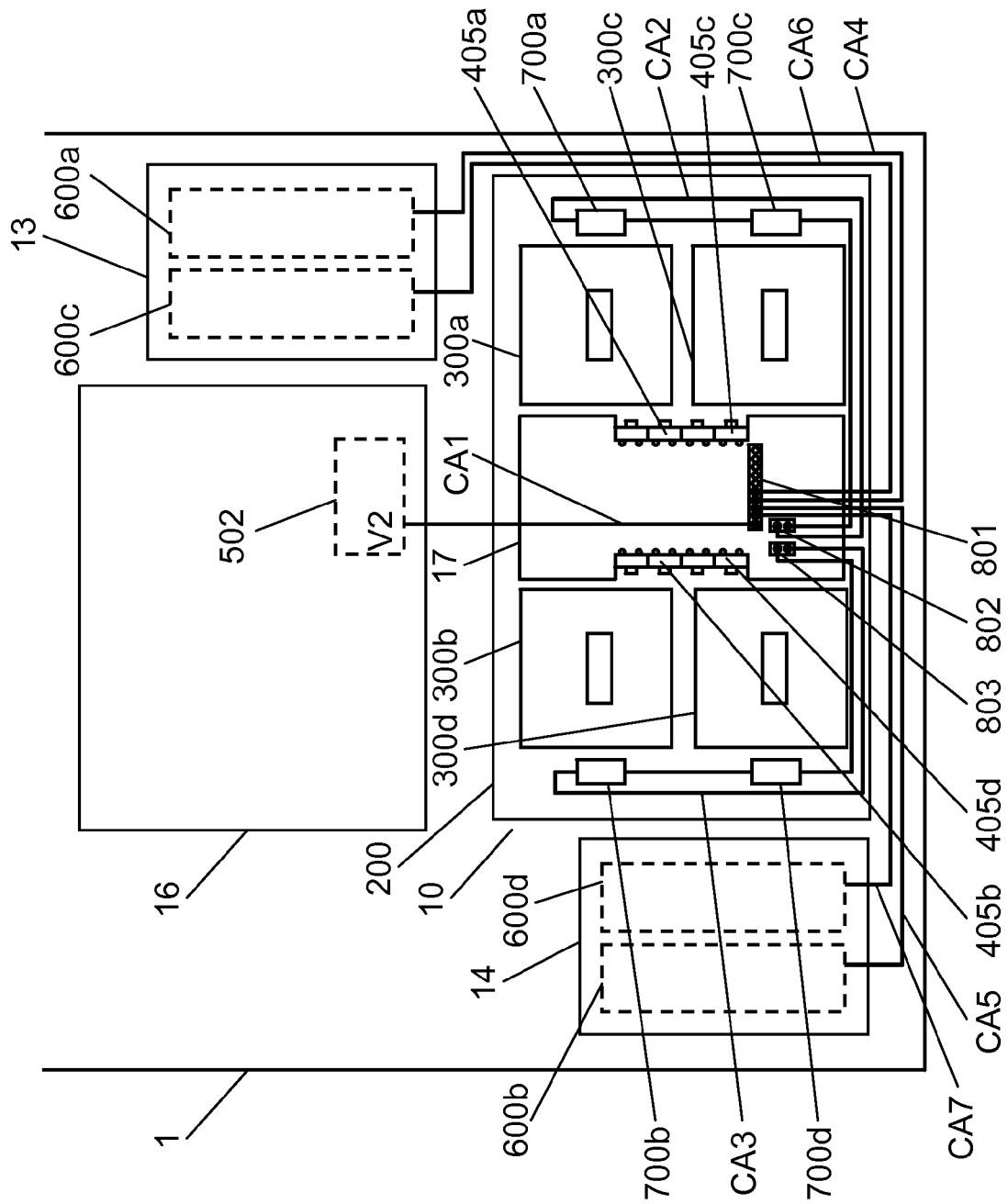
FIG. 10 is a diagram showing a wiring state of V2 signal line on which temperature switches and second detection switches are disposed in accordance with the exemplary embodiment.
Figure 11:
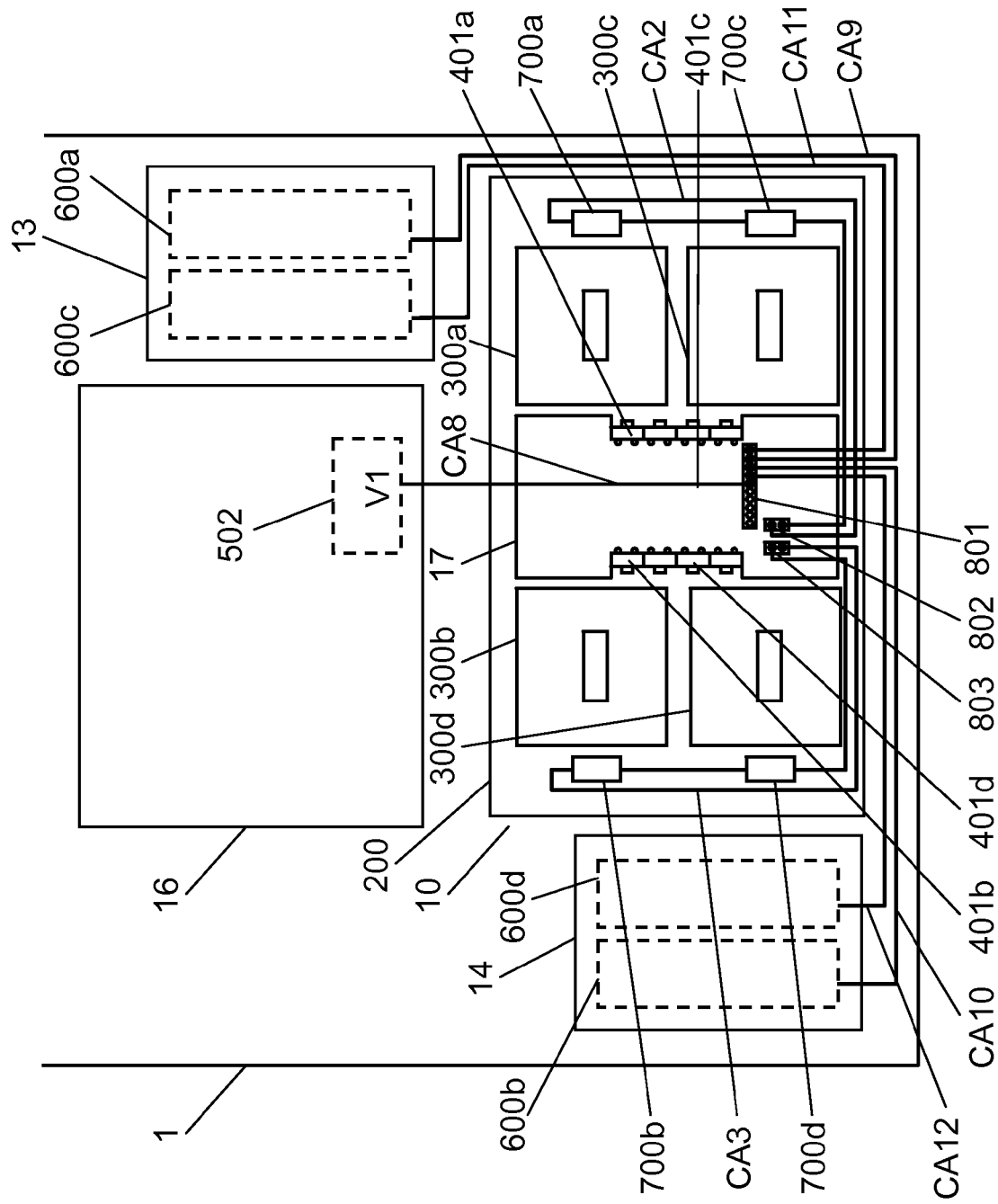
FIG. 11 is a diagram showing a wiring state of V1 signal line on which first detection switches are disposed in accordance with the exemplary embodiment.

FIG. 10 is a diagram showing a wiring state of V2 signal line L2 on which temperature switches 700 and second detection switches 405 are disposed. FIG. 11 is a diagram showing a wiring state of V1 signal line L1 on which first detection switches 401 are disposed. FIG. 10 and FIG. 11 are schematic diagrams when the inside of the projector is viewed from the top. In FIG. 10, the wiring of V1 signal line L1 is omitted for convenience. In FIG. 11, part of the wiring of V2 signal line L2 is omitted for convenience.

As shown in FIG. 10, first cable CA1 for supplying the relay drive voltage signal (V2) from lamp control power source unit 502 is connected to sub-circuit board 17 via first connector 801. Fourth cable CA4, fifth cable CA5, sixth cable CA6, and seventh cable CA7 are also connected to sub-circuit board 17 via first connector 801. Fourth cable CA4 leads the relay drive voltage signal (V2) output from second LF switch 405a to LF lamp power source unit 600a. Fifth cable CA5 leads the relay drive voltage signal (V2) output from second RF switch 405b to RF lamp power source unit 600b. Sixth cable CA6 leads the relay drive voltage signal (V2) output from second LB switch 405c to LB lamp power source unit 600c. Seventh cable CA7 leads the relay drive voltage signals (V2) output from second RB switch 405d to RB lamp power source unit 600d.

LF temperature switch 700a is disposed on the lateral side of LF lamp unit 300a and in proximity to LF lamp unit 300a. LB temperature switch 700c is disposed on the lateral side of LB lamp unit 300c and in proximity to LB lamp unit 300c. Temperature switches 700a and 700c are series-connected in the mid portion of second cable CA2. Both ends of second cable CA2 are connected to sub-circuit board 17 via second connector 802.

RF temperature switch 700b is disposed on the lateral side of RF lamp unit 300b and in proximity to RF lamp unit 300b. RB temperature switch 700d is disposed on the lateral side of RB lamp unit 300d and in proximity to RB lamp unit 300d. Temperature switches 700b and 700d are series-connected in the mid portion of third cable CA3. Both ends of third cable CA3 are connected to sub-circuit board 17 via third connector 803.

Next, as shown in FIG. 11, eighth cable CA8 for supplying the ballast control voltage signal (V1) from lamp control power source unit 502 is connected to sub-circuit board 17 via first connector 801. Ninth cable CA9, tenth cable CA10, eleventh cable CA11, and twelfth cable CA12 are also connected to sub-circuit board 17 via first connector 801. Ninth cable CA9 leads the ballast control voltage signal (V1) output from first LF switch 401a to LF lamp power source unit 600a. Tenth cable CA10 leads the ballast control voltage signal (V1) output from first RF switch 401b to RF lamp power source unit 600b. Eleventh cable CA11 leads the ballast control voltage signal (V1) output from first LB switch 401c to LB lamp power source unit 600c. Twelfth cable CA12 leads the ballast control voltage signal (V1) output from first RB switch 401d to RB lamp power source unit 600d.

Though not shown in FIG. 10 and FIG. 11, a cable for forming a ground line is disposed between lamp control power source unit 502 and sub-circuit board 17.

Figure 12:
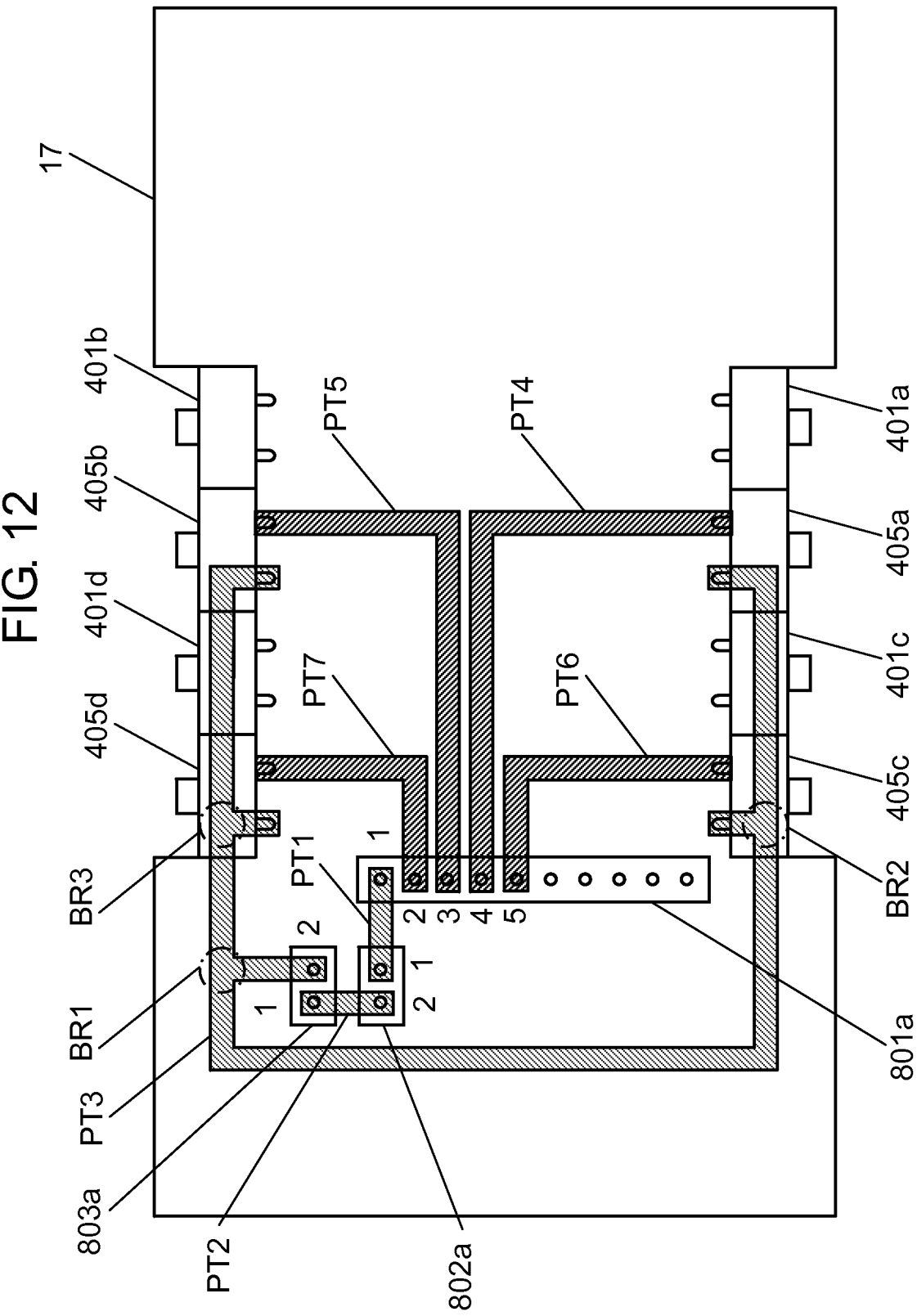
FIG. 12 is a diagram showing a wiring state of V2 signal line on a sub-circuit board in accordance with the exemplary embodiment.
Figure 13:
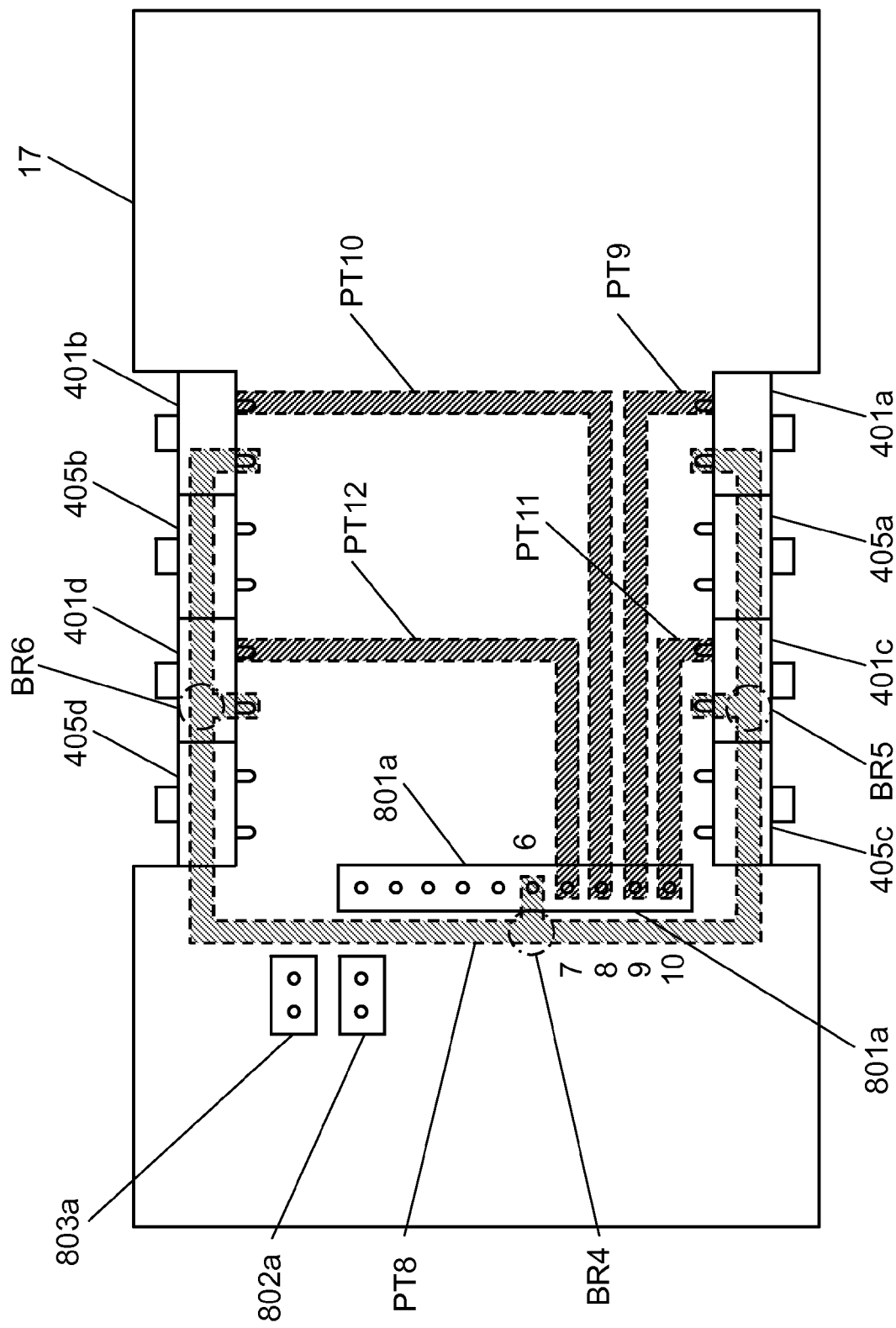
FIG. 13 is a diagram showing a wiring state of V1 signal line on the sub-circuit board in accordance with the exemplary embodiment.

FIG. 12 is a diagram showing a wiring state of V2 signal line L2 on sub-circuit board 17. FIG. 13 is a diagram showing a wiring state of V1 signal line L1 on sub-circuit board 17. FIG. 12 and FIG. 13 show schematic diagrams of conductive patterns PT1 through PT12 formed on sub-circuit board 17. The specific shapes and widths, for example, of conductive patterns PT1 through PT12 are designed appropriately for actual products. For convenience, in FIG. 12 and FIG. 13, first jack 801a, second jack 802a, third jack 803a, first detection switches 401a, 401b, 401c, and 401d, and second detection switches 405a, 405b, 405c, and 405d are shown in transparent states.

Other than first detection switches 401a, 401b, 401c, and 401d, and second detection switches 405a, 405b, 405c, and 405d, connectors 801a, 802a, and 803a on the jack sides of first connector 801, second connector 802, and third connector 803 (hereinafter, "first jack 801a", "second jack 802a", and "third jack 803a", respectively) are disposed on sub-circuit board 17.

As shown in FIG. 12, second detection switches 405a, 405b, 405c, and 405d on sub-circuit board 17, the first pin to the fifth pin of first jack 801a, second jack 802a, and third jack 803a are electrically connected via conductive patterns PT1 through PT7. These conductive patterns PT1 through PT7 are formed on the front side, for example, of sub-circuit board 17.

Conductive pattern PT1 connects the first pin of first jack 801a and the first pin of second jack 802a. Conductive pattern PT2 connects the second pin of second jack 802a and the first pin of third jack 803a.

Conductive pattern PT3 has three branches BR1, BR2, and BR3, where the pattern is branched. This conductive pattern connects the second pin of third jack 803a and the input pins of second detection switches 405a, 405b, 405c, and 405d.

Conductive pattern PT4 connects the output pin of second LF switch 405a and the fourth pin of first jack 801a. Conductive pattern PT5 connects the output pin of second RF switch 405b and the third pin of first jack 801a. Conductive pattern PT6 connects the output pin of second LB switch 405c and the fifth pin of first jack 801a. Conductive pattern PT7 connects the output pin of second RB switch 405d and the second pin of first jack 801a.

As shown in FIG. 13, first detection switches 401a, 401b, 401c, and 401d on sub-circuit board 17 and the sixth pin through the tenth pin of first jack 801a are electrically connected via conductive patterns PT8 through PT12. These conductive patterns PT8 through PT12 are formed on the back side, for example, of sub-circuit board 17.

Conductive pattern PT8 has three branches BR4, BR5, and BR6, where the pattern is branched. This conductive pattern connects the sixth pin of first jack 801a and the input pins of first detection switches 401a, 401b, 401c, and 401d.

Conductive pattern PT9 connects the output pin of first LF switch 401a and the ninth pin of first jack 801a. Conductive pattern PT10 connects the output pin of first RF switch 401b and the eighth pin of first jack 801a. Conductive pattern PT11 connects the output pin of first LB switch 401c and the tenth pin of first jack 801a. Conductive pattern PT12 connects the output pin of first RB switch 401d and the seventh pin of first jack 801a.

Figure 14:
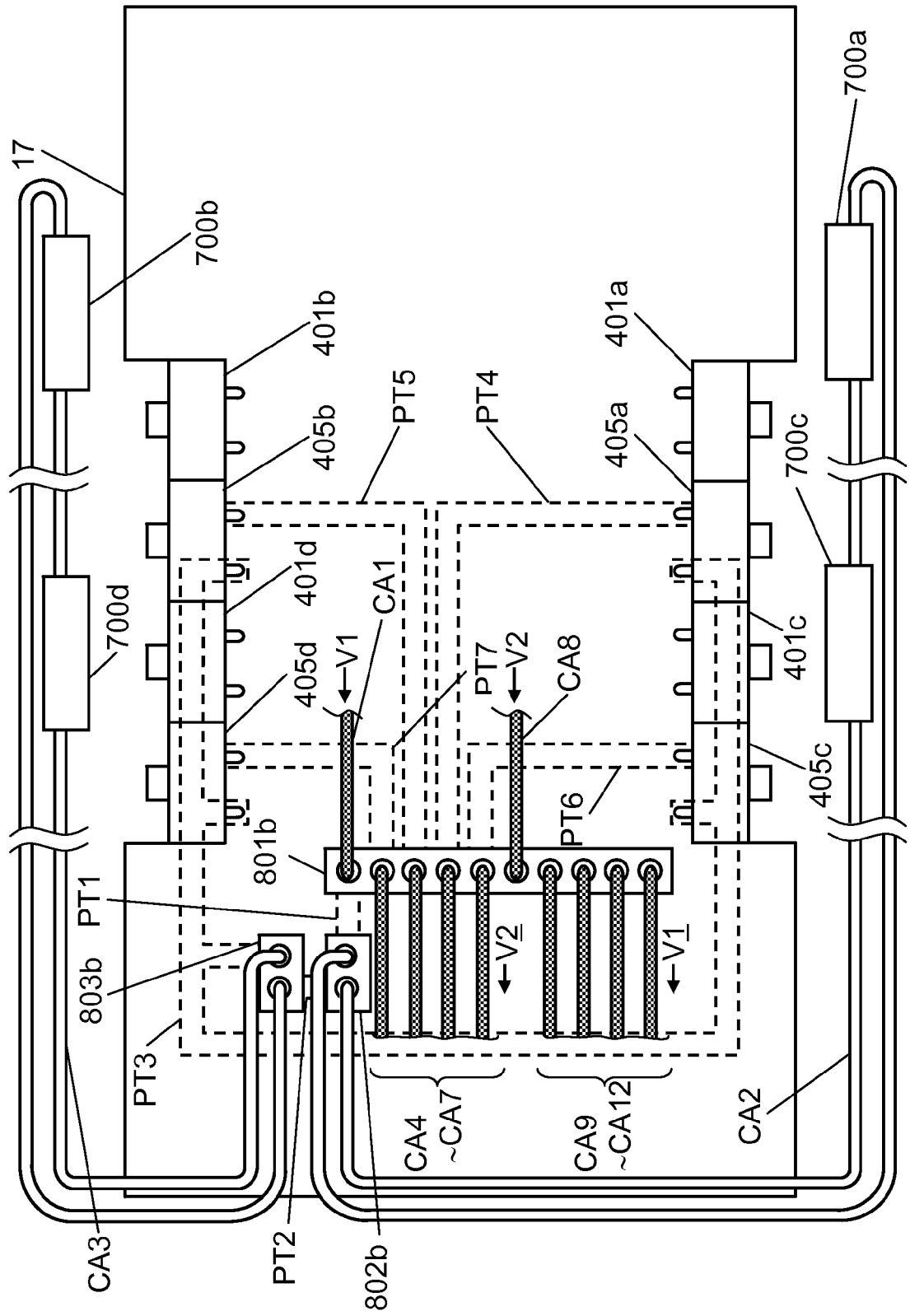
FIG. 14 is a diagram showing a state where a first cable through a twelfth cable are connected to the sub-circuit board in accordance with the exemplary embodiment.

FIG. 14 is a diagram showing a state where first cable CA1 through twelfth cable CA12 are connected to sub-circuit board 17. For convenience, FIG. 14 shows only conductive patterns PT1 through PT7 formed on the front side of sub-circuit board 17 with broken lines.

First cable CA1, and fourth cable CA4 through twelfth cable CA12 are connected to connector 801b on the plug side of first connector 801 (hereinafter, "first plug 801b"). First plug 801b is connected to first jack 801a. Thereby, first cable CA1 is connected to the first pin of first jack 801a, fourth cable CA4 through seventh cable CA7 are connected to the fourth pin, the third pin, the fifth pin, and the second pin of first jack 801a.

Both ends of second cable CA2 are connected to connector 802b on the plug side of second connector 802 (hereinafter, "second plug 802b"). Second plug 802b is connected to second jack 802a. Thereby, the end of second cable CA2 on the side of LF temperature switch 700a is connected to the first pin of second jack 802a. The end of second cable CA2 on the side of LB temperature switch 700c is connected to the second pin of second jack 802a.

Both ends of third cable CA3 are connected to connector 803b on the plug side of third connector 803 (hereinafter, "third plug 803b"). Third plug 803b is connected to third jack 803a. Thereby, the end of third cable CA3 on the side of RF temperature switch 700b is connected to the first pin of third jack 803a. The end of third cable CA3 on the side of RB temperature switch 700d is connected to the second pin of third jack 803a.

In this manner, the relay drive voltage signal (V2) generated in lamp control power source unit 502 is input to the first pin of first jack 801a via first cable CA1, and to second cable CA2 via conductive pattern PT1 and the first pin of second jack 802a. The relay drive voltage signal (V2) input to second cable CA2 goes through LF temperature switch 700a and LB temperature switch 700c, mid portion of is input to third cable CA3 via the second pin of second jack 802a, conductive pattern PT2, and the first pin of third jack 803a. The relay drive voltage signal (V2) input to third cable CA3 goes through RF temperature switch 700b and RB temperature switch 700d, mid portion of is input to the second pin of third jack 803a. In this manner, the relay drive voltage signal (V2) is input to the second pin of third jack 803a via single wiring from first cable CA1 through third cable CA3.

The relay drive voltage signal (V2) input to the second pin of third jack 803a is branched by conductive pattern PT3 and input to the input pins of second detection switches 405a, 405b, 405c, and 405d. The relay drive voltage signals (V2) output from the output pins of second detection switches 405a, 405b, 405c, and 405d are input to lamp power source units 600a, 600b, 600c, and 600d, respectively, via conductive patterns PT4 through PT7, first connector 801, fourth cable CA4 through seventh cable CA7.

On the other hand, the ballast control voltage signal (V1) generated in lamp control power source unit 502 is input to the sixth pin of first jack 801a via eighth cable CA8. The ballast control voltage signal (V1) input to the sixth pin of first jack 801a is branched by conductive pattern PT8 and input to the input pins of first detection switches 401a, 401b, 401c, and 401d. The ballast control voltage signals (V1) output from the output pins of first detection switches 401a, 401b, 401c, and 401d are input to lamp power source units 600a, 600b, 600c, and 600d, respectively, via conductive patterns PT9 through PT12, first connector 801, and ninth cable CA9 through twelfth cable CA12.

<Protection Control of Lamp Units>

Figure 15:
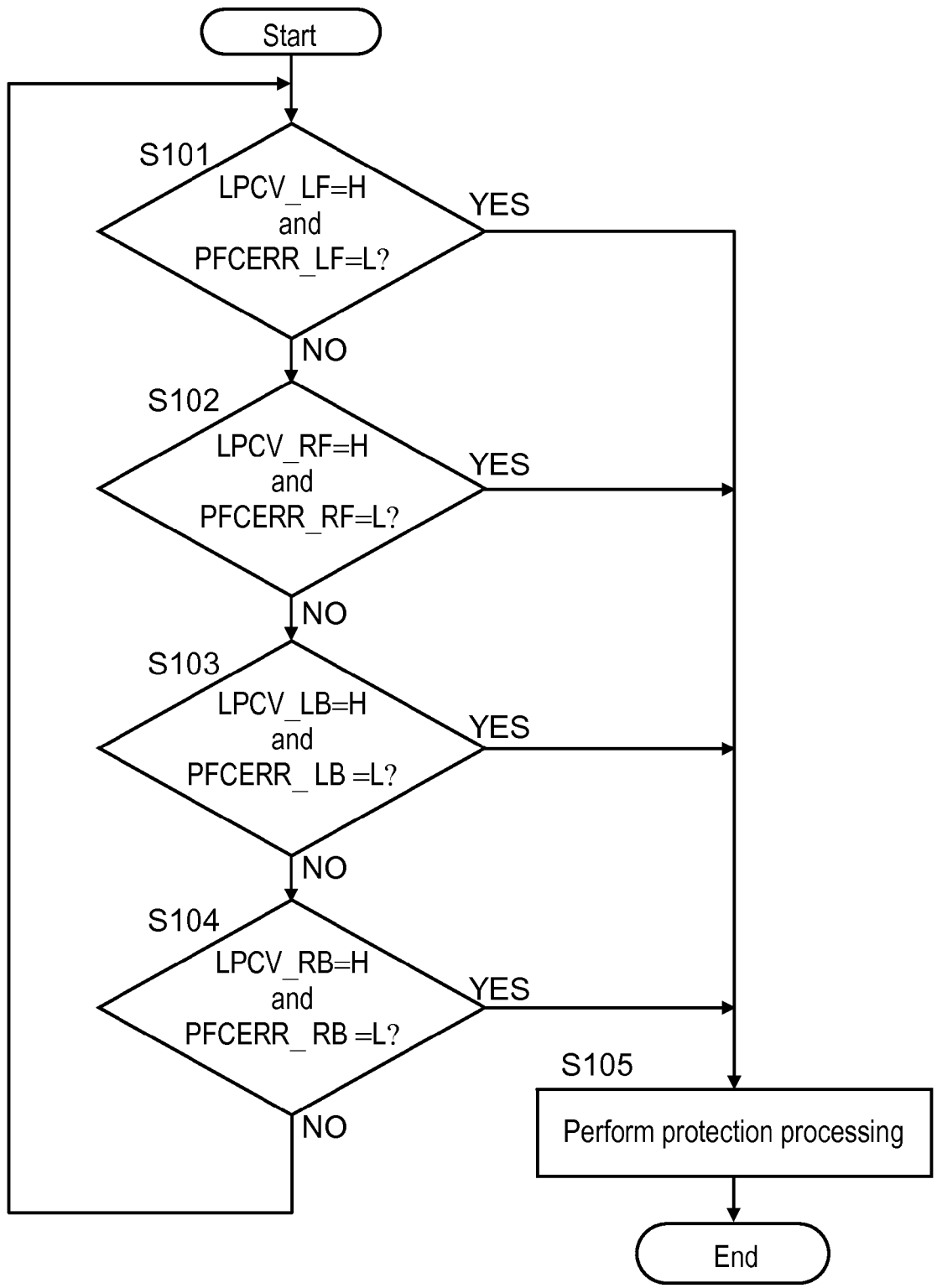
FIG. 15 is a flowchart showing processing procedure for protection control of the lamp units in accordance with the exemplary embodiment.

FIG. 15 is a flowchart showing processing procedure for protection control of the lamp units. FIG. 16 is a table showing the states of opening and closing signals (LPCV_LF, LPCV_RF, LPCV_LB, and LPCV_RB) and PFC error signals (PFCERR_LF, PFCERR_RF, PFCERR_LB, and PFCERR_RB) corresponding to respective lamp units 300a, 300b, 300c, and 300d when the projector is in various states. In FIG. 16, "H" shows a high-level signal, and "L" shows a low-level signal.

The protection control shown in FIG. 15 is performed by main control unit 501 while the projector is in operation, that is, lamp units 300 are turned on, liquid crystal panels 102, 103, and 104 are driven, and an image is projected on a screen.

During the operation, main control unit 501 monitors the states of opening and closing signals (LPCV) and PFC error signals (PFCERR) corresponding to lamp units 300a, 300b, 300c, and 300d. The main control unit determines whether or not the opening and closing signal (LPCV) is at the high level and the PFC error signal (PFCERR) is at the low level in any one of lamp units 300a, 300b, 300c, and 300d (S101 through S104).

When the projector operates normally, opening and closing signals (LPCV) and PFC error signals (PFCERR) are at the high level as shown in FIG. 16. In this case, main control unit 501 determines that the condition where an opening and closing signal (LPCV) is at the high level and a PFC error signal (PFCERR) is at the low level is not satisfied (S101: No, S102: No, S103: No, and S104: No), and keeps monitoring.

In the exemplary embodiment, any one of lamp units 300 in an unlit state caused by the end of life or a failure can be replaced while the operation is continued. Generally, the user opens lamp cover 7 in order to replace the lamp during the operation. However, the user may open lamp cover 7 inadvertently during the operation.

Inadvertent opening of lamp cover 7 can be determined by detecting the opening of lamp cover 7 corresponding to lamp unit 300 over which main control unit 501 performs control so as to turn on the lamp unit 300.

When any one of lamp covers 7 is opened during the operation, first detection switch 401 and second detection switch 405 open in lamp unit 300 corresponding to opened lamp cover 7. Thus, as shown in FIG. 16, both of the opening and closing signal (LPCV) and PFC error signal (PFCERR) are at the low level in the lamp unit.

At this time, as described above, in response the opening of first detection switch 401 and second detection switch 405, the driving of corresponding lamp power source unit 600 is stopped. Thus, lamp unit 300 corresponding to opened lamp cover 7 is turned off such that the user is protected. However, the other lamp units 300 are kept in the lit state. As required, part of the other lamp units 300 can be turned off, or part or the whole of the other lamp units 300 can be dimmed.

When any one of lamp covers 7 is opened, even if the lamp cover is inadvertently opened, it is only necessary to turn off at least corresponding lamp unit 300. Thus, also in this case, main control unit 501 determines that the condition where an opening and closing signal (LPCV) is at the high level and a PFC error signal (PFCERR) is at the low level is not satisfied (S101: No, S102: No, S103: No, and S104: No), and keeps monitoring. Since whole light source device 10 keeps operation even when any one of lamp covers 7 is opened, the lamp can be replaced while the operation is continued.

When the user closes lamp cover 7, first detection switch 401 and second detection switch 405 are closed. Thus, corresponding lamp unit 300 is ready to be turned on again, and the operation of lamp unit 300 can be started.

Next, if an abnormality occurs in any one of lamp units 300 or an abnormality occurs in a cooling fan (not shown) for cooling lamp units 300 and thus lamp units 300 are not cooled normally, any one of or all lamp units 300 can become in an overheated state. When lamp unit 300 overheats, the ambient temperature becomes high and temperature switch 700 corresponding to lamp unit 300 opens.

When such an abnormal temperature occurs, at least one temperature switch 700 opens in a state where lamp covers 7 are closed. Thereby, as shown in FIG. 16, the opening and closing signal (LPCV) becomes at the high level and the PFC error signal (PFCERR) becomes at the low level in each lamp unit 300.

Even when an abnormal temperature occurs and temperature switch 700 operates only in one lamp unit 300, whole light source device 100 can be in the overheated state. Thus, keeping normal operation in this state can be difficult.

In step S101, for example, main control unit 501 determines that the opening and closing signal (LPCV) is at the high level and the PFC error signal (PFCERR) is at the low level (S101: Yes), and performs protection processing (S105).

Main control unit 501 performs shutdown processing for stopping the operation, as protection processing. That is, main control unit 501 turns off all lit lamp units 300 and stops the operation of liquid crystal panels 102, 103, and 104. As required, the cooling fan may be driven for a predetermined period until lamp units 300 are cooled and thereafter stopped. After the shutdown processing is complete and the operation ends, main control unit 501 brings the projector into a standby state.

Next, when power factor improvement circuit 602 in any one of lamp power source units 600 does not operate normally for some reasons, the PFC error signal (PFCERR) from PFC control unit 602a of corresponding power factor improvement circuit 602 becomes at the low level as shown in FIG. 16. At this time, in lamp unit 300 corresponding abnormal lamp power source unit 600, the opening and closing signal (LPCV) remains at the high level.

When an abnormality occurs even in only one lamp power source unit 600 (power factor improvement circuit 602), it is not desirable that lamp power source unit 600 is left in the abnormal state while the operation is continued.

When an abnormality occurs in power factor improvement circuit 602 in LF lamp power source unit 600a, for example, in step S101, main control unit 501 determines that the opening and closing signal (LPCV) is at the high level and the PFC error signal (PFCERR) is at the low level (S101: Yes). Next, similarly to the case where an abnormal temperature occurs in lamp unit 300, the main control unit performs protection processing (S105).

Advantages of the Exemplary Embodiment

As described above, in accordance with the exemplary embodiment, all second detection switches 405 are disposed on sub-circuit board 17, and a relay drive voltage signal (V2) supplied from lamp control power source unit 502 is branched by conductive pattern PT3 on sub-circuit board 17 and led to respective second detection switches 405. This eliminates the need for connecting lamp control power source unit 502 and second detection switches 405 with cables. Thus, even when a plurality of second detection switches 405 are disposed, an increase in the number of cables caused by the switches can be suppressed. This can suppress increases in the wiring work and costs.

Similarly, in accordance with the exemplary embodiment, all first detection switches 401 are disposed on sub-circuit board 17, and a ballast control voltage signal (V1) supplied from lamp control power source unit 502 is branched by conductive pattern PT8 on sub-circuit board 17 and led to respective first detection switches 401. This eliminates the need for connecting lamp control power source unit 502 and first detection switches 401 with cables. Thus, even when a plurality of first detection switches 401 are disposed, an increase in the number of cables caused by the switches can be suppressed. This can suppress increases in the wiring work and costs.

In accordance with the exemplary embodiment, sub-circuit board 17 is disposed above mirror members 220 each of which is placed between a pair of right and left lamp units 300. Each of lamp covers 7 corresponding to the right and left lamp units 300 has lever 7a at the end on the side of mirror member 220. This lever 7a enables detection switches 401 and 405 disposed on sub-circuit board 17 to open and close. With this configuration, detection switches 401 and 405 corresponding to right and left lamp units 300 can be disposed centrally above mirror members 220. This can suppress an increase in the size of sub-circuit board 17 even when all detection switches 401 and 405 are disposed on sub-circuit board 17.

In accordance with the exemplary embodiment, sub-circuit board 17 is attached to mirror cover 250. This configuration facilitates placement of sub-circuit board 17 above mirror members 220.

In accordance with the exemplary embodiment, when any one of lamp cover 7 is opened, corresponding first detection switch 401 and second detection switch 405 are opened. This operation interrupts the ballast control voltage signal (V1) and the relay drive voltage signal (V2), and corresponding lamp power source unit 600 stops the driving of corresponding lamp unit 300. This configuration can prevent lamp unit 300 from being kept lit in the state where corresponding lamp cover 7 is opened.

In accordance with the exemplary embodiment, four temperature switches 700 corresponding to respective lamp units 300 are disposed in series with each other on V2 signal line L2 from lamp control power source unit 502 to second detection switches 405. With this configuration, when at least one temperature detector 700 detects an abnormal temperature in the periphery of the temperature detector 700, all lamp units 300 are turned off. Thus, light source device 10 can be protected against abnormal temperatures more carefully.

The ballast control voltage signal (V1) and the relay drive voltage signal (V2) in the exemplary embodiment correspond to "electrical signal" to be described in claims 1 through 5.
<Others>

The present invention is not limited to the above description of the exemplary embodiment, and the exemplary embodiment of the present invention can be modified into various forms other than the above exemplary embodiment.

Figure 17:
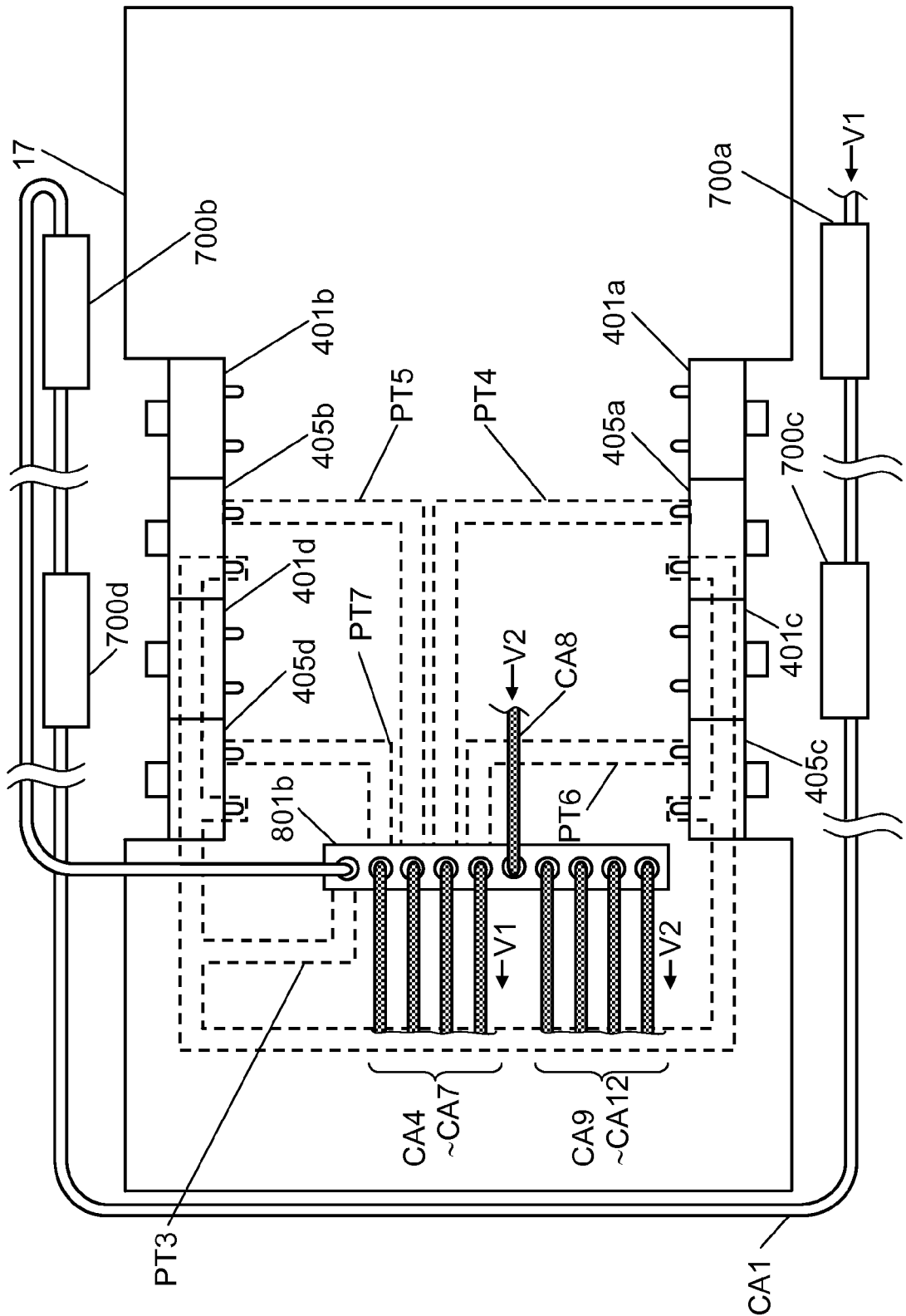
FIG. 17 is a diagram showing a configuration of a projector in accordance with a modification of the present invention.

For instance, in the above exemplary embodiment, as shown in FIG. 14, the wiring from lamp control power source unit 502 to conductive pattern PT3 is divided into three parts: first cable CA1; second cable CA2 having LF temperature switch 700a and LB temperature switch 700c disposed thereon; and third cable CA3 having RF temperature switch 700b and RB temperature switch 700d disposed thereon. However, the configuration is not limited to the above. As shown in FIG. 17, the wiring from lamp control power source unit 502 to conductive pattern PT3 may be formed of first cable CA1 only. In this case, four temperature switches 700a, 700b, 700c, and 700d are disposed in series with each other on first cable CAL Conductive pattern PT3 is connected to the first pin of first jack 801a.

However, as shown in the exemplary embodiment, the wiring work of the cables from lamp control power source unit 502 to sub-circuit board 17 can be facilitated by the following configuration. That is, LF temperature switch 700a, LB temperature switch 700c, and second cable CA2 are formed as one unit, and RF temperature switch 700b, RB temperature switch 700d, and third cable CA3 are formed as one unit.

In the above exemplary embodiment, four temperature switches 700 are disposed correspondingly to four lamp units 300. However, the configuration is not limited to the above. For instance, one temperature switch 700 may be disposed for a pair of LF lamp unit 300a and LB lamp unit 300c on the left side, and one temperature switch 700 may be disposed for a pair of RF lamp unit 300b and RB lamp unit 300d on the right side. In this case, preferably, one temperature switch 700 is disposed between the pair of lamp units 300. In this manner, as temperature switches corresponding to the respective lamp units, one temperature switch may correspond to a plurality of lamp units.

Figure 18A:
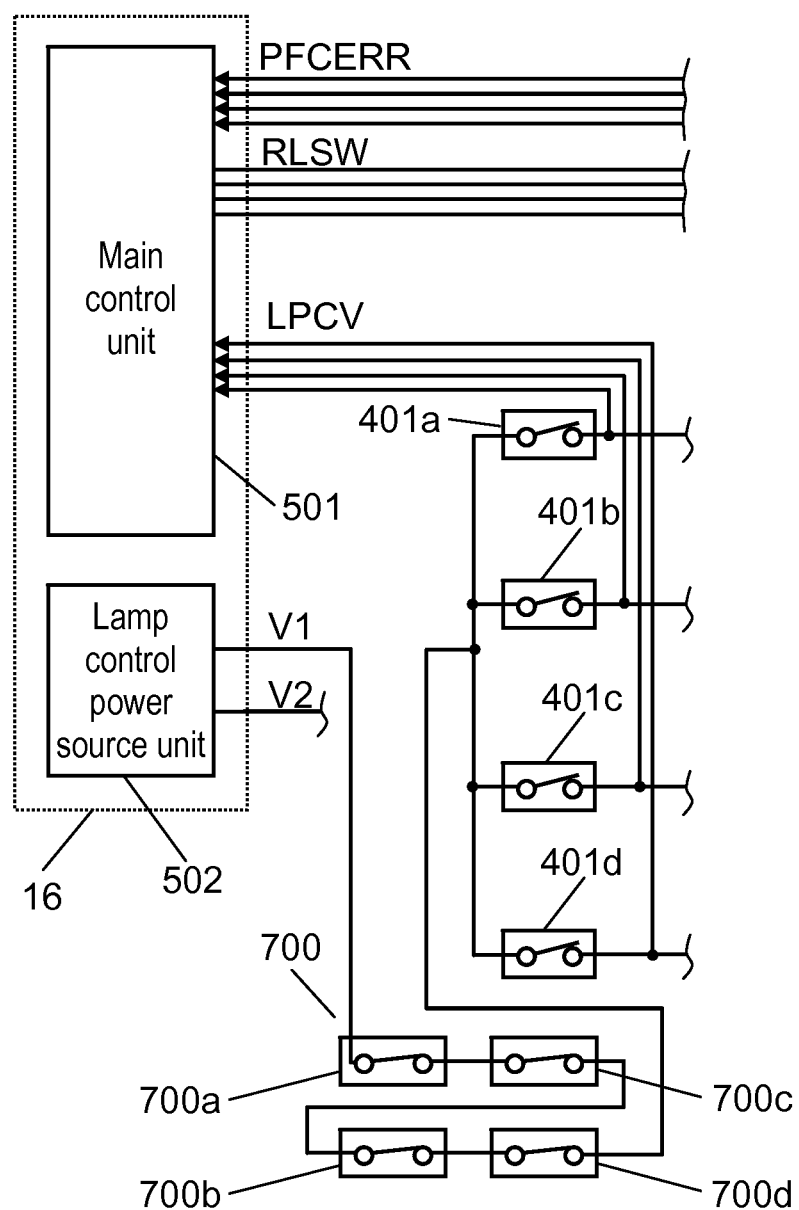
FIGS. 18A-B are diagrams showing a configuration of a projector in accordance with another modification of the present invention.
Figure 18B:
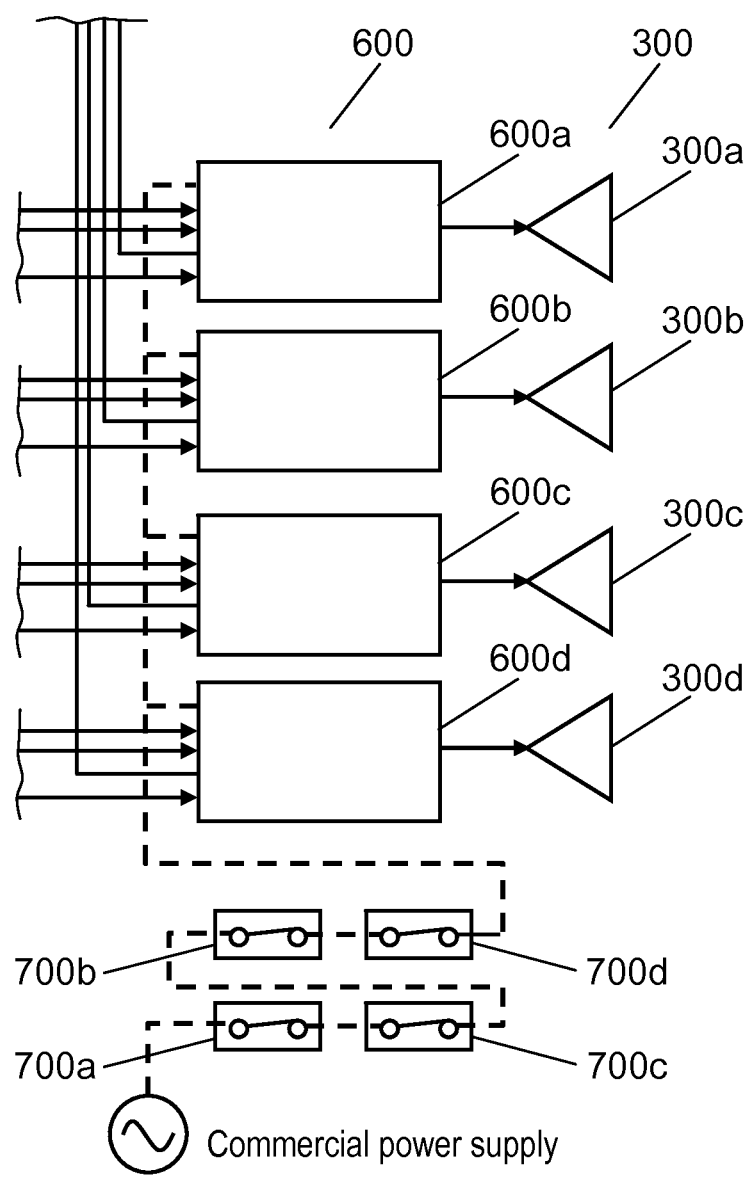

In this exemplary embodiment, four temperature switches 700 are disposed on V2 signal line L2. However, the configuration is not limited to the above. For instance, as shown in FIG. 18 (a), four temperature switches 700 may be disposed in series with each other on V1 signal line L1 from lamp control power source unit 502 to four first detection switches 401. In this case, when any one of temperature switches 700 opens, the ballast control voltage signal (V1) is interrupted. This stops the operation of lamp ballasts 603 and turns off lamp units 300. Alternatively, as shown in FIG. 18 (b), four temperature switches 700 may be disposed in series with each other on the power supply line from the commercial power supply to four lamp power source units 600. In this case, when any one of temperature switches 700 opens, the AC voltage signal from the commercial power supply is interrupted and lamp units 300 are turned off. The ballast control voltage signal (V1) supplied via the V1 signal line, the relay drive voltage signal (V2) supplied via the V2 signal line, and the AC voltage signal supplied via the power supply line correspond to "electrical signal supplied from the signal supply source" to be described in claim 6.

In the above exemplary embodiment, the light having emitted from each lamp unit 300 is combined by reflecting the light with mirror member 220 (planar mirror 222). Instead of the mirror, a prism may be used as the light combiner.

In the above exemplary embodiment, light source device 10 is formed of lamp units 300 each including a lamp light source. However, light source device 10 may be formed of light source units each including an LED light source or a laser light source. Further, the projector of the above exemplary embodiment is a four-lamp projector, but the present invention is applicable to multi-lamp projectors other than the four-lamp projector.

The exemplary embodiment of the present invention can be modified in various ways as appropriate within the scope of the technical ideas described in the claims.

REFERENCE MARKS IN THE DRAWINGS

1 Main body cabinet
3a Lamp aperture (aperture)
7 Lamp cover (light source cover)
7a Lever (actuator)
10 Light source device
11 Optical system
17 Sub-circuit board (circuit board)
102, 103, 104 Liquid crystal panel (light modulator)
220 Mirror member (light combiner)
250 Mirror cover (combiner cover)
300 Lamp unit (light source)
401 First detection switch (opening and closing detector)

405 Second detection switch (opening and closing detector)
502 Lamp control power source unit (supply part)
600 Lamp power source unit (light source driver)
700 Temperature switch (temperature detector)
PT3 Conductive pattern (conductive path)
PT8 Conductive pattern (conductive path)
801 First connector
801a First jack (input part)
803 Third connector
803a Third jack (input part)

The invention claimed is:

1. A projection display device, comprising:
a light source device including a plurality of light sources and combining light from the light sources such that the combined light emits from the light source device;
a light modulator for modulating the light having emitted from the light source device;
a main body cabinet having the light source device and the light modulator disposed therein;
a plurality of apertures disposed in the main body cabinet such that the respective light sources are taken in and out therethrough;
a plurality of light source covers for covering the respective apertures;
a plurality of opening and closing detectors disposed correspondingly to the respective light source covers and detecting opening and closing of the respective light source covers; and
a supply part for supplying an electrical signal to the respective opening and closing detectors,
wherein the respective opening and closing detectors are disposed on one circuit board, and
the circuit board includes
an input part to which the electrical signal is input from the supply part; and
a conductive path for branching the electrical signal having input to the input part and for leading the branched signal to each of the opening and closing detectors.

2. The projection display device of claim 1, wherein
the light source device includes a pair of the light sources facing each other and a light combiner, the light combiner being disposed between one and an other one of the pair of light sources and combining the light having emitted from each of the pair of light sources,
the apertures and the light source covers corresponding to the respective light sources are disposed above the pair of light sources,
the circuit board is disposed above the light combiner,
each of the opening and closing detectors is disposed on the circuit board in proximity to one of the light source covers corresponding to the opening and closing detector, and
at an end of each of the light source covers on a side of the light combiner, an actuator is disposed so as to bring one of the opening and closing detectors corresponding to each light source cover into an operating state or a non-operating state in response to opening and closing of the light source cover.

3. The projection display device of claim 2, further comprising a combiner cover over the light combiner, wherein the circuit board is attached to the combiner cover.

4. The projection display device of claim 1, further comprising a plurality of light source drivers disposed correspondingly to the respective light sources and driving the respective light sources,
wherein the electrical signal is input to the respective light source drivers via the respective opening and closing detectors,
when one of the light source covers corresponding to one of the opening and closing detectors is opened, the opening and closing detector interrupts the electrical signal, and
when the electrical signal is interrupted, a corresponding one of the light source drivers stops driving of a corresponding one of the light sources.

5. The projection display device of claim 1, further comprising a plurality of temperature detectors disposed correspondingly to the respective light sources,
wherein the respective temperature detectors are disposed in series with each other on a signal line from the supply part to the input part and interrupt the electrical signal when a detected temperature exceeds a threshold.

6. A projection display device, comprising:
a light source device including a plurality of light sources and combining light from the light sources such that the combined light emits from the light source device;
a plurality of light source drivers disposed correspondingly to the respective light sources and driving the respective light sources; and
a plurality of temperature detectors disposed in different positions in periphery of the respective light sources,
wherein an electrical signal obtained by branching an electrical signal from a signal supply source is input to the respective light source drivers such that the light source drivers drive the respective light sources,
the respective temperature detectors are disposed in series with each other on a signal line from the supply part to places where the electrical signal is branched, and interrupt the electrical signal from the supply part when a detected temperature exceeds a threshold,
when the electrical signal from the supply part is interrupted and thereby the respective branched electrical signals are not input, the light source drivers stop driving of the respective light sources.

7. The projection display device of claim 2, further comprising a plurality of light source drivers disposed correspondingly to the respective light sources and driving the respective light sources,
wherein the electrical signal is input to the respective light source drivers via the respective opening and closing detectors,
when one of the light source covers corresponding to one of the opening and closing detectors is opened, the opening and closing detector interrupts the electrical signal, and
when the electrical signal is interrupted, a corresponding one of the light source drivers stops driving of a corresponding one of the light sources.

8. The projection display device of claim 3, further comprising a plurality of light source drivers disposed correspondingly to the respective light sources and driving the respective light sources,
wherein the electrical signal is input to the respective light source drivers via the respective opening and closing detectors,
when one of the light source covers corresponding to one of the opening and closing detectors is opened, the opening and closing detector interrupts the electrical signal, and
when the electrical signal is interrupted, a corresponding one of the light source drivers stops driving of a corresponding one of the light sources.

9. The projection display device of claim 2, further comprising a plurality of temperature detectors disposed correspondingly to the respective light sources,
wherein the respective temperature detectors are disposed in series with each other on a signal line from the supply part to the input part and interrupt the electrical signal when a detected temperature exceeds a threshold.

10. The projection display device of claim 3, further comprising a plurality of temperature detectors disposed correspondingly to the respective light sources,
   wherein the respective temperature detectors are disposed in series with each other on a signal line from the supply part to the input part and interrupt the electrical signal when a detected temperature exceeds a threshold.

11. The projection display device of claim 4, further comprising a plurality of temperature detectors disposed correspondingly to the respective light sources,
   wherein the respective temperature detectors are disposed in series with each other on a signal line from the supply part to the input part and interrupt the electrical signal when a detected temperature exceeds a threshold.

12. The projection display device of claim 7, further comprising a plurality of temperature detectors disposed correspondingly to the respective light sources,
   wherein the respective temperature detectors are disposed in series with each other on a signal line from the supply part to the input part and interrupt the electrical signal when a detected temperature exceeds a threshold.

13. The projection display device of claim 8, further comprising a plurality of temperature detectors disposed correspondingly to the respective light sources,
   wherein the respective temperature detectors are disposed in series with each other on a signal line from the supply part to the input part and interrupt the electrical signal when a detected temperature exceeds a threshold.

* * * * *